(12) United States Patent
Miyake

(10) Patent No.: US 10,651,510 B2
(45) Date of Patent: May 12, 2020

(54) STACKED-CELL BATTERY

(71) Applicant: TOYOTA JIDOSHA KABUSHIKI KAISHA, Toyota-shi, Aichi-ken (JP)

(72) Inventor: Hideaki Miyake, Nisshinn (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 253 days.

(21) Appl. No.: 15/952,724

(22) Filed: Apr. 13, 2018

(65) Prior Publication Data

US 2018/0301761 A1  Oct. 18, 2018

(30) Foreign Application Priority Data

Apr. 13, 2017  (JP) ................ 2017-079709

(51) Int. Cl.
*H01M 10/0585* (2010.01)
*H01M 10/42* (2006.01)

(52) U.S. Cl.
CPC ... *H01M 10/0585* (2013.01); *H01M 10/4207* (2013.01)

(58) Field of Classification Search
CPC ......... H01M 10/0585; H01M 10/4207; H01M 10/052; H01M 2/202; H01M 2/266; H01M 10/0413
See application file for complete search history.

(56) References Cited

U.S. PATENT DOCUMENTS

| 6,576,371 | B1 * | 6/2003 | Yasuda | ............... | C08G 79/025 |
|||||| 429/309 |
| 7,776,478 | B2 * | 8/2010 | Klaassen | ............... | H01M 4/13 |
|||||| 429/300 |
| 2004/0253519 | A1 * | 12/2004 | Oldani | ............... | C25B 9/04 |
|||||| 429/238 |
| 2014/0302390 | A1 | 10/2014 | Miyake | | |

FOREIGN PATENT DOCUMENTS

JP   2014-203701 A   10/2014

* cited by examiner

*Primary Examiner* — Muhammad S Siddiquee
(74) *Attorney, Agent, or Firm* — Sughrue Mion, PLLC

(57) ABSTRACT

To provide a stacked-cell battery that does not require formation of collector tabs and that has high production efficiency.

The stacked-cell battery comprises a plurality of stacked unit cells 10 and has a cell region 100 and a collection region 200, the ends of the negative electrode collector layers 1 and positive electrode collector layers 5 on the collection region 200 side having shapes that do not include recesses or raised sections as viewed in the stacking direction, the collection region 200 comprising negative electrode collecting sections 30 that are connected to each of the extensions of the negative electrode collector layers 1 of the plurality of unit cells 10, and electrically connect them, but are not connected to the extensions of the positive electrode collector layers 5, and positive electrode collecting sections 32 that are connected to each of the extensions of the positive electrode collector layers 5 of the plurality of unit cells 10, and (Continued)

electrically connect them, but are not connected to the extensions of the negative electrode collector layers 1.

7 Claims, 19 Drawing Sheets

CROSS-SECTIONAL VIEW ALONG LINE A-A      CROSS-SECTIONAL VIEW ALONG LINE B-B

WIDTHWISE DIRECTION

STACKED-CELL BATTERY

TECHNICAL FIELD

The present disclosure relates to a stacked-cell battery.

BACKGROUND ART

Stacked-cell batteries are known that have unit cells in a stacked form, for improved energy density and safety. In a stacked-cell battery, in order to extract generated electric power to the outside, collector layers of the positive and negative electrodes are electrically connected, so that they collect current, and are connected to exterior terminals.

PTL 1, for example, describes a construction for current collection, comprising collector outer extensions in which the collector layers extend to the outside.

CITATION LIST

Patent literature

[PTL 1] Japanese Unexamined Patent Publication No. 2014-203701

DISCLOSURE OF THE INVENTION

Problems to be Solved by the Invention

The collector outer extensions used for current collection are commonly known in the industry as "collector tabs", and are usually formed by cutting the rectangular collector layer into the desired shape, typically a shape having recesses or raised sections in the in-plane direction of the collector layer.

The collector layers are generally formed as thin-films in order to improve the volumetric efficiency of the stacked-cell battery. Because thin-film collector layers are difficult to cut, productivity during the collector tab-forming step is low. This compromises the overall production efficiency for the stacked-cell battery.

It is an object of the present disclosure to provide a stacked-cell battery that does not require formation of collector tabs and that has high production efficiency.

Means for Solving the Problems

This object of the disclosure is achieved by the following aspects of the disclosure.

A stacked-cell battery in which a plurality of unit cells are stacked, the unit cell each comprising a negative electrode collector layer, a negative electrode active material layer, a solid electrolyte layer or a separator, a positive electrode active material layer, and a positive electrode collector layer, stacked in that order, the stacked-cell battery having a stacking direction in which the unit cells are stacked, an in-plane direction perpendicular to the stacking direction, a lengthwise direction and a widthwise direction perpendicular to the lengthwise direction in the in-plane direction, wherein the stacked-cell battery, as viewed from the stacking direction, has:

1) a cell region each comprising the negative electrode collector layer, the negative electrode active material layer, the solid electrolyte layer or the separator, the positive electrode active material layer, and the positive electrode collector layer, and 2) a collection region adjacent in the lengthwise direction of the cell region, each comprising an extension of the negative electrode collector layer, an extension of the solid electrolyte layer, or an extension of the separator or an insulating sheet, an extension of the positive electrode collector layer, a negative electrode collecting section, and a positive electrode collecting section, wherein the respective collection-region-side-ends of the extensions of the negative electrode collector layers and the extensions of the positive electrode collector layers have shapes that do not include recesses or raised sections, as viewed from the stacking direction, wherein the negative electrode collecting sections and the positive electrode collecting sections are at the ends of the collection region on the side opposite the cell region, and mutually separated in the widthwise direction by a spacing between them, as seen from the stacking direction, wherein the negative electrode collecting sections are connected to each of the extensions of the negative electrode collector layers of the plurality of unit cells to electrically connect the extensions of the negative electrode collector layers of the plurality of unit cells together but are not connected to the extensions of the positive electrode collector layers, wherein the positive electrode collecting sections are connected to each of the extensions of the positive electrode collector layers of the plurality of unit cells to electrically connect the extensions of the positive electrode collector layers of the plurality of unit cells together, but are not connected to the extensions of the negative electrode collector layers, and wherein at the collecting sections, the extensions of the solid electrolyte layers or the extensions of the separators or the insulating sheets lie all interspaces between the negative electrode collector layers and positive electrode collector layers of the stacked-cell battery.

[2] The stacked-cell battery according to [1], wherein the ends of the extensions of the solid electrolyte layers or the extensions of the separators or the insulating sheets on the side opposite the cell regions in the lengthwise direction, are anchored in the negative electrode collecting sections or the positive electrode collecting sections.

[3] The stacked-cell battery according to [1] or [2], wherein the negative electrode collecting sections are composed of a plurality of negative electrode collecting members, and each of the plurality of negative electrode collecting members comprising an in-plane direction region extending in the lengthwise direction and a stacking direction region extending in the stacking direction, the in-plane direction regions of the negative electrode collecting members being electrically connected respectively to the extensions of the negative electrode collector layers, and the stacking direction regions of the plurality of negative electrode collecting members being connected in the stacking direction together either directly or through the extensions of the negative electrode collector layers, so that the plurality of negative electrode collecting members are electrically connected together, and the positive electrode collecting sections are composed of a plurality of positive electrode collecting members, each of the plurality of positive electrode collecting members comprising an in-plane direction region extending in the lengthwise direction and a stacking direction region extending in the stacking direction, the in-plane direction regions of the positive electrode collecting members being electrically connected respectively to the extensions of the positive electrode collector layers, and the stacking direction regions of the plurality of positive electrode collecting members being connected in the stacking direction together either directly or through the extensions of the positive electrode collector layers, so that the plurality of positive electrode collecting members are electrically connected together.

[4] The stacked-cell battery according to [3], wherein plurality of the stacking direction regions of the negative electrode collecting members are connected in the stacking direction through the extensions of the negative electrode collector layers, first lengths of the plurality of negative electrode collecting members are smaller in the stacking direction than second lengths of the plurality of negative electrode collecting members, the first lengths of the negative electrode collecting members in the stacking direction being lengths from the extensions of the solid electrolyte layers or the extensions of the separators or the insulating sheets to the extensions of the negative electrode collector layers, and the second lengths of the negative electrode collecting members in the stacking direction being lengths from the extensions of the solid electrolyte layers or the extensions of the separators or the insulating sheets to the extensions of the positive electrode collector layers, and plurality of the stacking direction regions of the positive electrode collecting members are connected in the stacking direction through the extensions of the positive electrode collector layers, first lengths of the plurality of positive electrode collecting members are smaller in the stacking direction than second lengths of the plurality of positive electrode collecting members, the first lengths of the positive electrode collecting members in the stacking direction being lengths from the extensions of the solid electrolyte layers or the extensions of the separators or the insulating sheets to the extensions of the positive electrode collector layers, the second lengths of the plurality of positive electrode collecting members in the stacking direction being lengths from the extensions of the solid electrolyte layers or the extensions of the separators or the insulating sheets to the extensions of the negative electrode collector layers.

[5] The stacked-cell battery according to [3] or [4], wherein the negative electrode collecting members and the positive electrode collecting members are members continuous on the outsides of the ends of the extensions of the solid electrolyte layers or the extensions of the separators or the insulating sheets, the end being opposite from the cell region in the lengthwise direction.

[6] The stacked-cell battery according to [3] or [4], wherein the negative electrode collecting members and the positive electrode collecting members are members continuous through the extensions of the solid electrolyte layers or the extensions of the separators or the insulating sheets at the ends of the extensions of the solid electrolyte layers or the extensions of the separators or the insulating sheets, the end being opposite from the cell region in the lengthwise direction.

[7] The stacked-cell battery according to any one of [1] to [6], wherein the length of the collection region in the stacking direction and the length of the cell region in the stacking direction are approximately equal.

Effect of the Invention

The stacked-cell battery of the disclosure does not need to have collector tabs formed for current collection. The stacked-cell battery of the disclosure therefore has high production efficiency.

BEST MODE FOR CARRYING OUT THE INVENTION

Figure 1A:
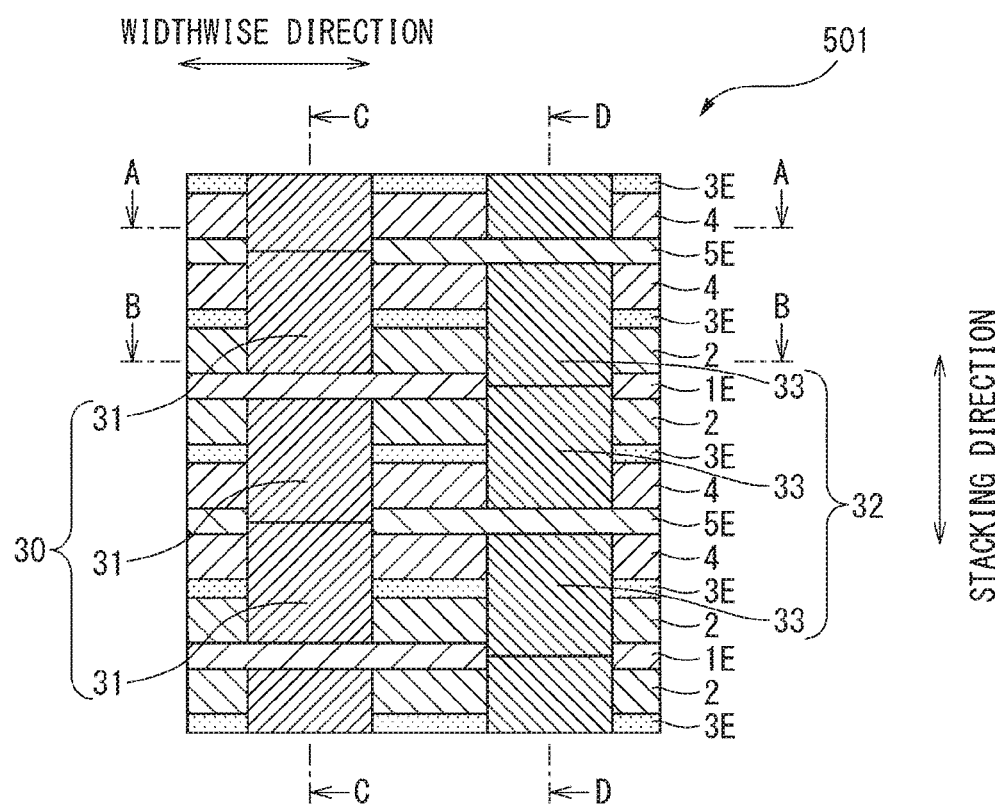
FIG. 1A is a schematic diagram for illustration of an example of an embodiment of a stacked-cell battery of the disclosure.

An example of a preferred embodiment of the present disclosure will now be described.

The stacked-cell battery of the disclosure is a stacked-cell battery in which a plurality of unit cells that are stacked, the unit cell each comprising a negative electrode collector layer, a negative electrode active material layer, a solid electrolyte layer or a separator, a positive electrode active material layer, and a positive electrode collector layer, stacked in that order, the stacked-cell battery having a stacking direction in which the unit cells are stacked, an in-plane direction perpendicular to the stacking direction, a lengthwise direction and a widthwise direction perpendicular to the lengthwise direction in the in-plane direction, wherein the stacked-cell battery, as viewed from the stacking direction, has:

1) cell regions comprising the negative electrode collector layer, the negative electrode active material layer, the solid electrolyte layer or the separator, the positive electrode active material layer, and the positive electrode collector layer, and 2) collection regions adjacent in the lengthwise direction of the cell region, comprising an extension of the negative electrode collector layer, an extension of the solid electrolyte layer or an extension of the separator or an insulating sheet, an extension of the positive electrode collector layer, a negative electrode collecting section, and a positive electrode collecting section, wherein the respective collection-region-side-ends of the extension of the negative electrode collector layer and the extension of the positive electrode collector layer have shapes that do not include recesses or raised sections, as viewed from the stacking direction, wherein the negative electrode collecting sections and the positive electrode collecting sections are at the end of the collection region opposite from the cell region, and mutually separated in the widthwise direction by spacings between them, as seen from the stacking direction, wherein the negative electrode collecting sections are connected to each of the extensions of the negative electrode collector layers of the plurality of unit cells to electrically connect the extensions of the negative electrode collector layers of the plurality of unit cells together but are not connected to the extensions of the positive electrode collector layers, wherein the positive electrode collecting sections are connected to each of the extensions of the positive electrode collector layers of the plurality of unit cells to electrically connect the extensions of the positive electrode collector layers of the plurality of unit cells together but are not connected to the extensions of the negative electrode collector layers, and wherein at the collecting sections, the extensions of the solid electrolyte layers or the extensions of the separators or the insulating sheets lie all interspaces between the negative electrode collector layers and positive electrode collector layers of the stacked-cell battery.

In the stacked-cell battery of the disclosure, the ends of the extensions of the solid electrolyte layers or the extensions of the separators or the insulating sheets on the opposite side from the cell region in the lengthwise direction may be anchored in the negative electrode collecting section or the positive electrode collecting section.

The stacked-cell battery of the disclosure may be an all-solid-state battery wherein the unit cells have solid electrolyte layers, or it may be a wet cell battery wherein the unit cells have separators and also an electrolyte solution.

The stacked-cell battery of the disclosure has a stacking direction in which each of the layers are stacked, and an in-plane direction perpendicular to the stacking direction. The in-plane direction has a lengthwise direction and a widthwise direction perpendicular to the lengthwise direction. When the terms "stacking direction", "in-plane direction", "lengthwise direction", and "widthwise direction" are used throughout the present specification, they refer to the directions with respect to the stacking direction of the stacked-cell battery.

First Embodiment of Stacked-Cell Battery

Figure 1B:
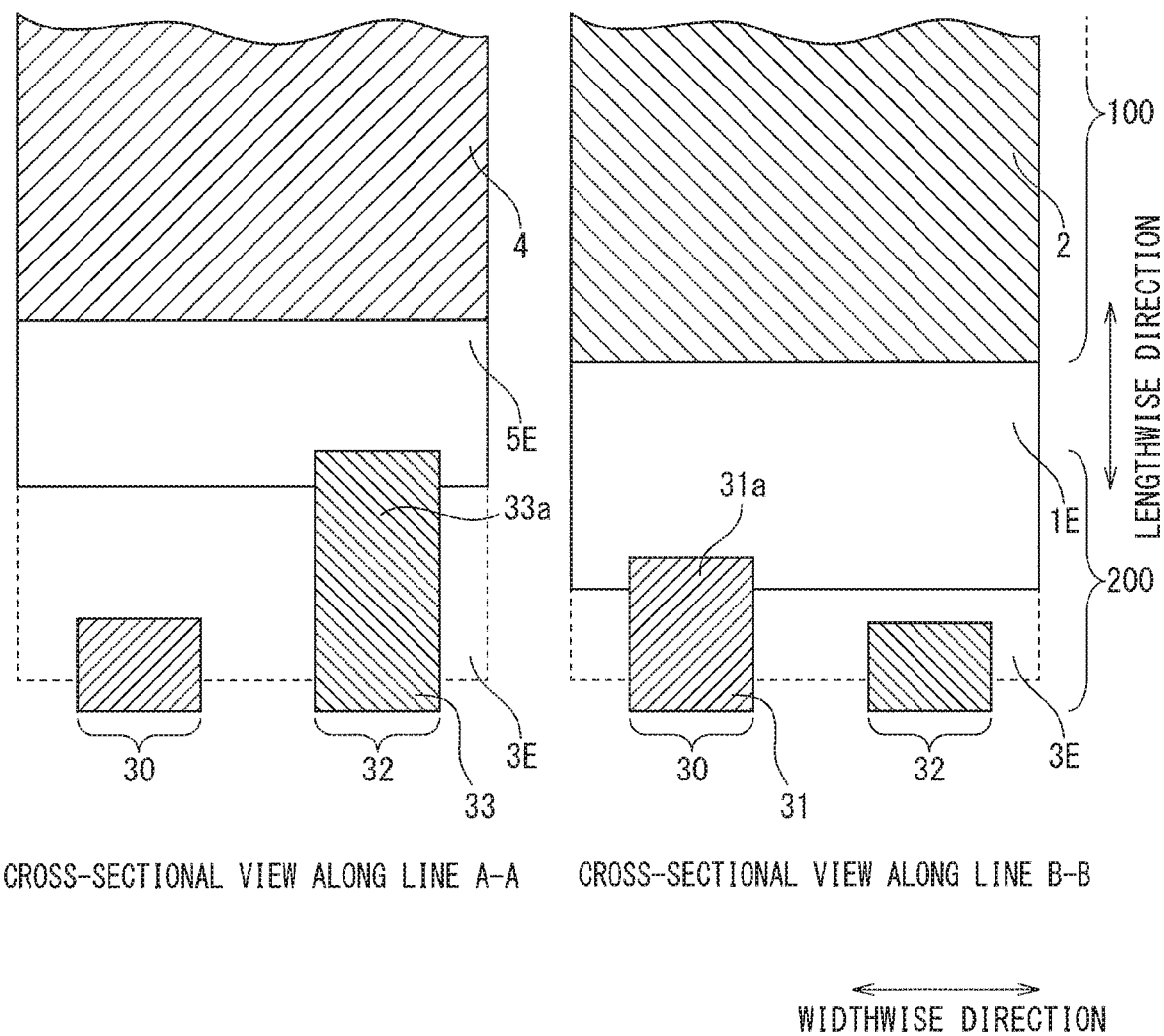
FIG. 1B shows a cross-sectional view along line A-A and a cross-sectional view along line B-B of FIG. 1A.
Figure 1C:
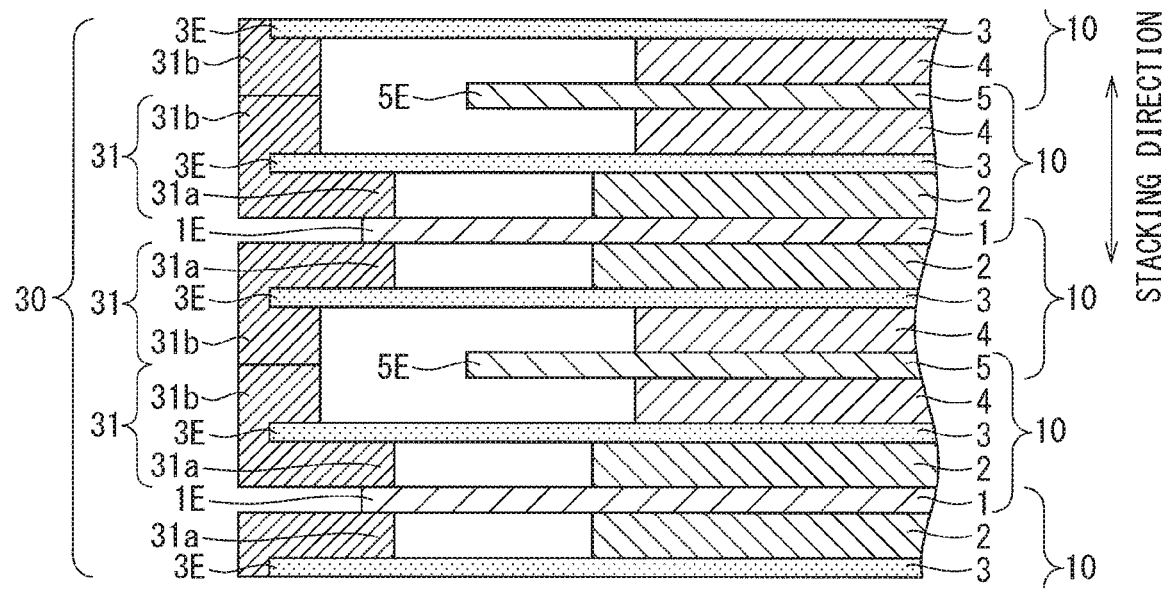
FIG. 1C shows a cross-sectional view along line C-C and a cross-sectional view along line D-D of FIG. 1A.
Figure 1C:
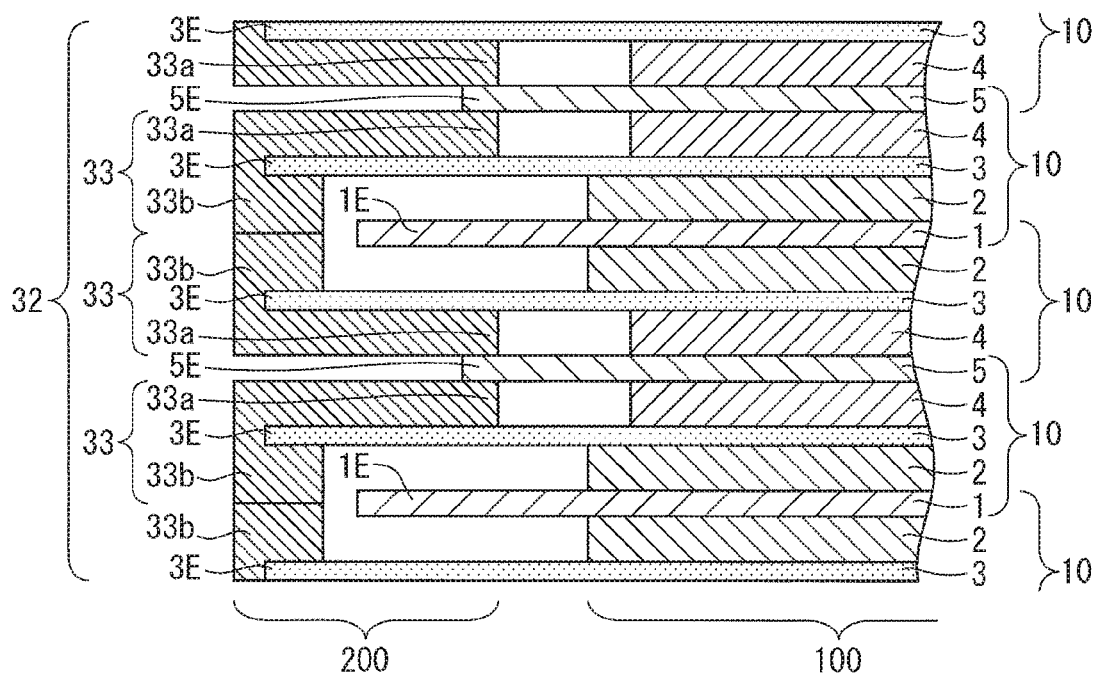

An example of a typical construction of the embodiment of the stacked-cell battery is shown in FIGS. 1A to C.

FIG. 1A is a diagram of the stacked-cell battery 501 as seen from the collection region side in the lengthwise direction, FIG. 1B is a cross-sectional view along line A-A and a cross-sectional view along line B-B of FIG. 1A, and FIG. 1C is a cross-sectional view along line C-C and a cross-sectional view along line D-D of FIG. 1A.

The stacked-cell battery 501 has, as viewed from the stacking direction and the widthwise direction, a cell region 100, and a collection region 200 adjacent in the lengthwise direction of the cell region (FIG. 1B and FIG. 1C).

The stacked-cell battery 501 is a stacked-cell battery in which a plurality of unit cells 10 are stacked in the cell region 100, the unit cells comprising a negative electrode collector layer 1, a negative electrode active material layer 2, a solid electrolyte layer or separator 3, a positive electrode active material layer 4 and a positive electrode collector layer 5 stacked in that order (FIG. 1C).

The collection region 200 has an extension of the negative electrode collector layer 1E, an extension of the solid electrolyte layer or an extension of the separator 3E, an extension of the positive electrode collector layer 5E, a negative electrode collecting section 30 and a positive electrode collecting section 32 (FIG. 1C).

In the cell region 100 of the stacked-cell battery 501, the stacking order of each of the layers in the plurality of unit cells 10 that are adjacent in the stacking direction may be the same order in the stacking direction, or the reverse order. Adjacent unit cells 10 may also have a construction in which they share a positive electrode collector layer 5 or negative electrode collector layer 1. In the cell region 100 of the stacked-cell battery 501 shown in FIG. 1, the plurality of unit cells 10 share a negative electrode collector layer 1 or positive electrode collector layer 5 between adjacent unit cells, with the stacking orders of each of the layers being reversed.

When the stacked-cell battery 501 is viewed from the stacking direction, the extension of the negative electrode collector layer 1E and the extension of the positive electrode collector layer 5E each have a form with no recess or raised section at the end on the collection region 200 side (FIG. 1B). That is, the negative electrode collector layer 1 and the positive electrode collector layer 5 do not have "collector tabs", and therefore these collector layers do not require cutting at the ends.

When the stacked-cell battery 501 is viewed from the stacking direction, the negative electrode collecting section 30 and the positive electrode collecting section 32 are at the end of the collection region 200 on the opposite side from the cell region 100, i.e. on the lower side as depicted in FIG. 1B, and they are mutually separated in the widthwise direction by spacings between them (FIG. 1B).

In the collection region 200 of the stacked-cell battery 501, each extension of the solid electrolyte layer or extension of the separator 3E may be present between each of the extension of the negative electrode collector layer 1E and the extension of the positive electrode collector layer 5E (FIG. 1C), in the stacking direction. Such a construction allows short circuiting between the positive and negative electrodes to be avoided.

In the stacked-cell battery 501, the extension of the solid electrolyte layer or extension of the separator 3E have their ends on the side opposite from the cell region 100 in the lengthwise direction anchored to, either or both, and preferably both, the negative electrode collecting section 30 and positive electrode collecting section 32 (FIG. 1C). Such a construction ensures insulation between the extension of the negative electrode collector layer 1E and the extension of the positive electrode collector layer 5E, while facilitating production of the stacked-cell battery 501.

The negative electrode collecting section 30 is connected to the respective extensions of the negative electrode collector layers 1E in the plurality of unit cells 10, and electrically connects the extensions of the negative electrode collector layers 1E of the plurality of unit cells 10 together (FIG. 1C).

As shown by the outlines in FIG. 1A, and in the cross-sectional view along line C-C in FIG. 1C, the negative electrode collecting section 30 may be composed of a plurality of negative electrode collecting members 31. Each of the plurality of negative electrode collecting members 31 may have an in-plane direction region 31$a$, extending in the lengthwise direction, and a stacking direction region 31$b$, extending in the stacking direction.

The negative electrode collecting member 31 may be made of metal, for example. The negative electrode collecting member 31 may be an integrally formed member, or it may be formed by bending and cutting a metal sheet. The metal sheet may have any suitable thickness. Bending and cutting of a metal sheet with a suitable thickness is easier than cutting of the metal foils during formation of collector tabs for the collector layers.

The in-plane direction region 31$a$ of the negative electrode collecting member 31 is present on the side of the extension of the solid electrolyte layer or extension of the separator 3E where the extension of the negative electrode collector layer 1E is present, and is not present on the side where the extension of the positive electrode collector layer 5E is present (FIG. 1C, cross-sectional view along line C-C).

Since the in-plane direction region 31$a$ of the negative electrode collecting member 31 is present on the side of the extension of the solid electrolyte layer or extension of the separator 3E where the extension of the negative electrode collector layer 1E is present, the negative electrode collecting member 31 and the extension of the negative electrode collector layer 1E are electrically connected (see cross-sectional view along line B-B of FIG. 1B, and cross-sectional view along line C-C of FIG. 1C).

Also, since the in-plane direction region 31$a$ of the negative electrode collecting member 31 is not present on the side of the extension of the solid electrolyte layer or extension of the separator 3E where the extension of the positive electrode collector layer 5E is present, the negative electrode collecting member 31 and the extension of the positive electrode collector layer 5E are not electrically connected (see cross-sectional view along line A-A of FIG. 1B and cross-sectional view along line C-C of FIG. 1C).

These may be achieved by differentiating lengths of the extension of the negative electrode collector layer 1E side and the extension of the positive electrode collector layer 5E side of the plurality of negative electrode collecting members 31 in the lengthwise direction and in the stacking direction with respect to the extension of the solid electrolyte layer or extension of the separator 3E.

For example, the length of each of the negative electrode collecting members 31 in the lengthwise direction may be long enough to reach the extension of the negative electrode collector layer 1E, on the side of the extension of the solid electrolyte layer or extension of the separator 3E where the extension of the negative electrode collector layer 1E is present (cross-sectional view along line B-B in FIG. 1B), and short enough so that it does not reach the extension of the positive electrode collector layer 5E on the side where the extension of the positive electrode collector layer 5E is present (cross-sectional view along line A-A in FIG. 1B).

Also, the plurality of negative electrode collecting members 31 are connected together in the stacking direction either directly or via the extensions of the negative electrode collector layers 1E, and thus, the plurality of negative electrode collecting members 31 and the extensions of the negative electrode collector layers 1E of the plurality of unit cells 10 are electrically connected in the stacking direction. The specific construction is as follows.

On the side of the extension of the solid electrolyte layer or extension of the separator 3E where the extension of the positive electrode collector layer 5E is present, the stacking direction region 31$b$ of the negative electrode collecting member 31 is electrically connected in direct contact with the stacking direction region 31$b$ of another adjacent negative electrode collecting member 31 in the stacking direction. Also, on the side where the extension of the negative electrode collector layer 1E is present, the in-plane direction region 31$a$ of the negative electrode collecting member 31 is electrically connected in contact with the in-plane direction region 31$a$ of another adjacent negative electrode collecting member 31 via the extension of the negative electrode collector layer 1E, in the stacking direction.

In order to achieve such electrical connection, the lengths of the negative electrode collecting members 31 in the stacking direction are set, with respect to the extension of the solid electrolyte layer or extension of the separator 3E, so as to be long enough so that the stacking direction region 31$b$ of the negative electrode collecting member 31 directly contacts with the stacking direction region 31$b$ of another adjacent negative electrode collecting member 31 in the stacking direction, on the side where the extension of the positive electrode collector layer 5E is present, and so as to be short enough so that the in-plane direction region 31$a$ of the negative electrode collecting member 31 contacts with the in-plane direction region 31$a$ of another adjacent negative electrode collecting member 31 via the extension of the negative electrode collector layer 1E, in the stacking direction, on the side where the extension of the negative electrode collector layer 1E is present. More specifically, the lengths of the negative electrode collecting members 31 in the stacking direction, on the side where the extension of the negative electrode collector layer 1E is present, may be shorter than the lengths of the negative electrode collecting members 31 in the stacking direction on the side where the extension of the positive electrode collector layer 5E is present. For example, the lengths of the negative electrode collecting members 31 in the stacking direction, on the side where the extension of the negative electrode collector layer 1E is present, may be shorter than the lengths of the negative electrode collecting members 31 in the stacking direction on the side where the extension of the positive electrode collector layer 5E is present, by half the length of the extension of the negative electrode collector layer 1E in the stacking direction.

The positive electrode collecting section 32 will be easily understood by reversing the positive and negative electrodes in the above explanation of the negative electrode collecting section 30. More specifically, it may be as follows.

The positive electrode collecting sections 32 are connected to the extensions of the positive electrode collector layers 5E of the plurality of unit cells 10, and electrically connects the extensions of the positive electrode collector layers 5E of the plurality of unit cells 10 together, but they are not connected to the extensions of the negative electrode collector layers 1E.

Each positive electrode collecting section 32 may be composed of a plurality of positive electrode collecting members 33. The positive electrode collecting member 33 may have an in-plane direction region 33a, extending in the lengthwise direction, and a stacking direction region 33b, extending in the stacking direction. The in-plane direction region 33a of the positive electrode collecting member 33 is electrically connected to the extension of the positive electrode collector layer 5E. The plurality of positive electrode collecting members 33 are connected directly or via the extensions of the positive electrode collector layers 5E. These provide electrical connection between the plurality of positive electrode collecting members 33 and between the extensions of the positive electrode collector layers 5E of the plurality of unit cells 10, in the stacking direction.

The in-plane direction region 33a of the positive electrode collecting member 33 is present on the side of the extension of the solid electrolyte layer or extension of the separator 3E where the extension of the positive electrode collector layer 5E is present, but is not present on the side where the extension of the negative electrode collector layer 1E is present (FIG. 1C, cross-sectional view along line D-D). The lengths of the plurality of positive electrode collecting members 33 in the lengthwise direction may be long enough to reach the extension of the positive electrode collector layer 5E, on the side of the extension of the solid electrolyte layer or extension of the separator 3E where the extension of the positive electrode collector layer 5E is present (cross-sectional view along line A-A in FIG. 1B), and short enough so that it does not reach the extension of the negative electrode collector layer 1E on the side where the extension of the negative electrode collector layer 1E is present (cross-sectional view along line B-B in FIG. 1B). The lengths of the positive electrode collecting members 33 in the stacking direction, on the side where the extension of the positive electrode collector layer 5E is present, may be shorter than the lengths of the positive electrode collecting members 33 in the stacking direction, on the side where the extension of the negative electrode collector layer 1E is present, and for example, shorter by half the length of the extension of the extension of the positive electrode collector layer 5E in the stacking direction.

In the stacked-cell battery 501 shown in FIG. 1A to FIG. 1C, the negative electrode collecting members 31 and positive electrode collecting members 33 are each electrically connected in the stacking direction by being continuous in the stacking direction on the outsides of the ends on the side of the extension of the solid electrolyte layer or extension of the separator 3E opposite from the cell region 100, in the lengthwise direction.

<Method for Producing Stacked-Cell Battery According to First Embodiment>

The stacked-cell battery 501 shown in FIG. 1A to FIG. 1C may be produced by the following method, for example.

A method for producing a stacked-cell battery comprising a plurality of unit cells that are stacked, the unit cells comprising a negative electrode collector layer, a negative electrode active material layer, a solid electrolyte layer or a separator, a positive electrode active material layer and a positive electrode collector layer stacked in that order, wherein a negative electrode collecting member and a positive electrode collecting member are fitted at the end of the extension of the solid electrolyte layer or the extension of the separator, and a solid electrolyte layer with a collecting member or a separator with a collecting member is obtained, a negative electrode active material layer is formed on both sides of each negative electrode collector layer to obtain a negative electrode stack, a positive electrode active material layer is formed on both sides of each positive electrode collector layer to obtain a positive electrode stack, and the solid electrolyte layer with a collecting member or separator with a collecting member, the negative electrode stack, the solid electrolyte layer with a collecting member or separator with a collecting member, and the positive electrode stack, are stacked in that order to obtain a stacked-cell battery.

Figure 2:
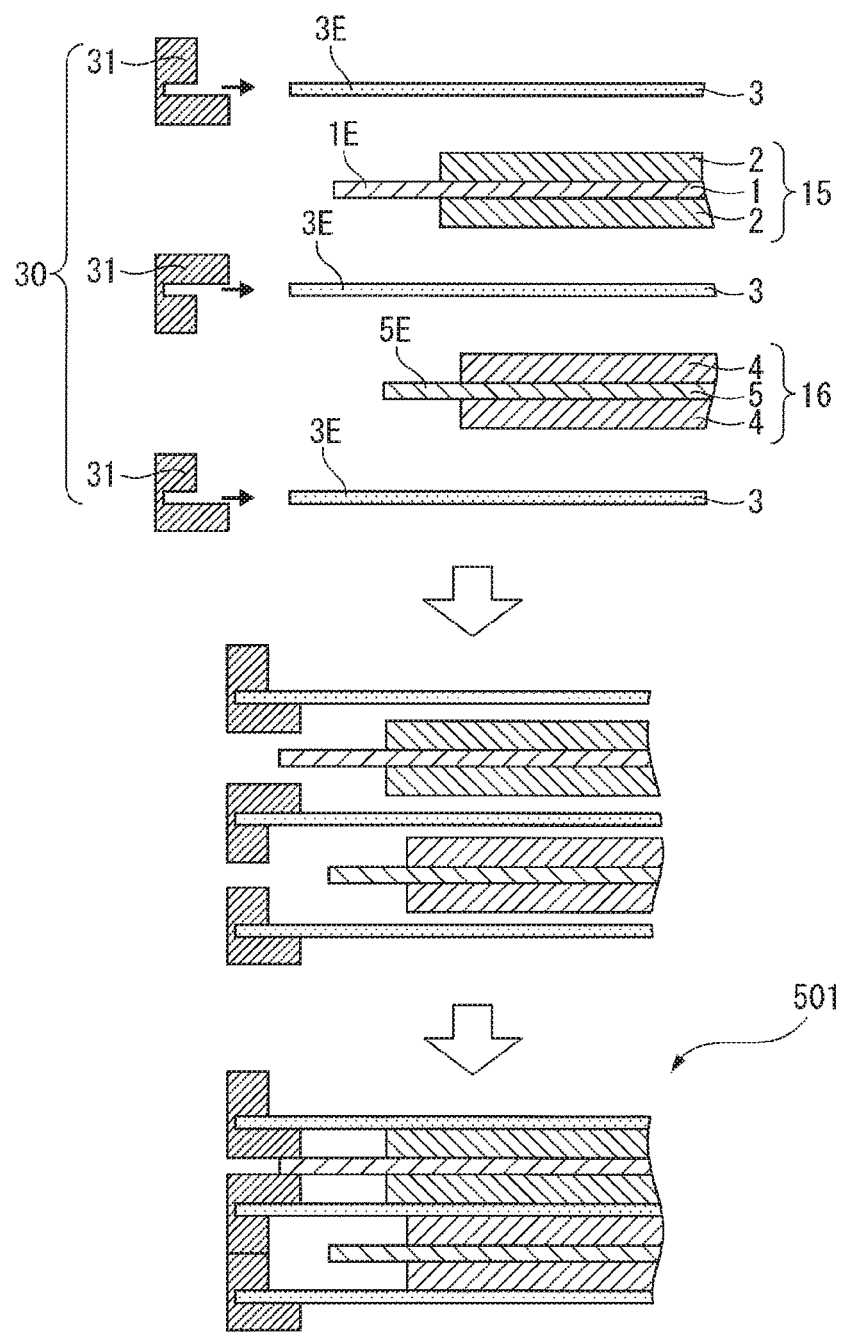
FIG. 2 is a schematic diagram for illustration of an example of a method for producing a stacked-cell battery of the disclosure.

This production method may be carried out by the steps illustrated in FIG. 2, for example. FIG. 2 shows a production procedure for the stacked-cell battery 501, in a cross-sectional view, cut on a plane parallel to the lengthwise direction and the stacking direction that includes a negative electrode collecting section 30.

A negative electrode collecting member 31 and a positive electrode collecting member 33 are fitted at the end of the extension 3E of the solid electrolyte layer or separator. In this step, the end of the extension 3E of the solid electrolyte or separator is inserted and fixed in openings of the negative electrode collecting member 31 and positive electrode collecting member 33. The location of the extension 3E of the solid electrolyte layer or separator where the negative electrode collecting member 31 and positive electrode collecting member 33 are to be fitted may have a suitable reinforcing material, such as an insulating film, and specifically a polyimide film or polyethylene terephthalate (PET) film, attached to it.

Figure 3:
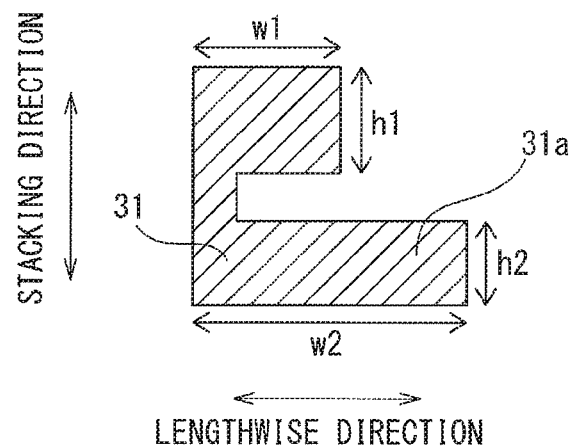
FIG. 3 is a magnified view of a collecting member used in the production method illustrated in FIG. 2.

FIG. 3 shows a magnified view of the collecting member as an example of the negative electrode collecting member 31. The negative electrode collecting member 31 is a member which has a vertically asymmetrical shape with different sizes for the top side length w1 and the bottom side length w2, and the top portion height h1 and the bottom portion height h2, in terms of the vertical relationship shown in FIG. 3. In the subsequent stacking step, the portion including the long bottom side with length w2 forms an in-plane direction region 31a of a negative electrode collecting member extending in the in-plane direction, and it is disposed facing the side of the extension of the negative electrode collector layer 1E. Also, the portion including the short top side with length w1 forms a stacking direction region 31b of a negative electrode collecting member extending in the stacking direction, and it is disposed facing the side of the positive electrode collector layer 5. Thus, at every two extensions of solid electrolyte layers or extensions of the separators 3E that are adjacent in the stacking direction, the two negative electrode collecting members 31 may be fitted so as to be oriented in opposite directions in the stacking direction (see FIG. 2).

The bottom side length w2 of the negative electrode collecting member 31 may be a length such that the negative electrode collecting member 31 contacts the extension of the negative electrode collector layer 1E after the negative electrode collecting member 31 has been fitted at the end of the extension of the solid electrolyte layer or extension of the separator 3E to form the stacked-cell battery 501. The top side length w1 of the negative electrode collecting member 31 may be a length such that after the stacked-cell battery 501 has been assembled, the negative electrode collecting member 31 does not contact with the extension of the positive electrode collector layer 5E. The top side length w1 is sufficient so long as it is a length such that after the stacked-cell battery 501 has been assembled, the negative electrode collecting member 31 does not contact with the extension of the positive electrode collector layer 5E, and the relationship w2<w1 does not necessarily need to be satisfied.

In the negative electrode collecting member 31 shown in FIG. 3, the stacking direction length h1 on the side of the extension of the positive electrode collector layer 5E is longer than the stacking direction length h2 on the side of the extension of the negative electrode collector layer 1E. This is because the negative electrode collecting member 31 is situated so that the bottom side end faces the side where the extension of the negative electrode collector layer 1E is present, and contacts with the extension of the negative electrode collector layer 1E, while the top side end faces the side where the extension of the positive electrode collector layer 5E is present, and does not contact with the extension of the positive electrode collector layer 5E. Therefore, as described above, the lengths h2 of the negative electrode collecting members 31 in the stacking direction, on the side where the extensions of the negative electrode collector layers 1E are present, may be shorter than the lengths h1 of the negative electrode collecting members 31 in the stacking direction, on the sides where the extensions of the positive electrode collector layers 5E are present. Specifically, the lengths h2 of the negative electrode collecting members 31 in the stacking direction, on the sides where the extensions of the negative electrode collector layers 1E are present, may be shorter than the lengths h1 of the negative electrode collecting members 31 in the stacking direction, on the sides where the extensions of the positive electrode collector layers 5E are present, by half the lengths of the extensions of the negative electrode collector layers 1E in the stacking direction.

For satisfactory conduction in the stacking direction, the length h1 of the negative electrode collecting member 31 may be about ½ of the spacing between two extensions of the solid electrolyte layer or extensions of the separator 3E that are adjacent in the stacking direction.

The positive electrode collecting member 33 may be a member having a vertically asymmetrical shape, with the size of each member set with the same considerations as for the negative electrode collecting member 31. The positive electrode collecting member 33, similar to the negative electrode collecting member 31, may be fitted at a prescribed location at the end of the extension of the solid electrolyte layer or extension of the separator 3E.

Figure 4:
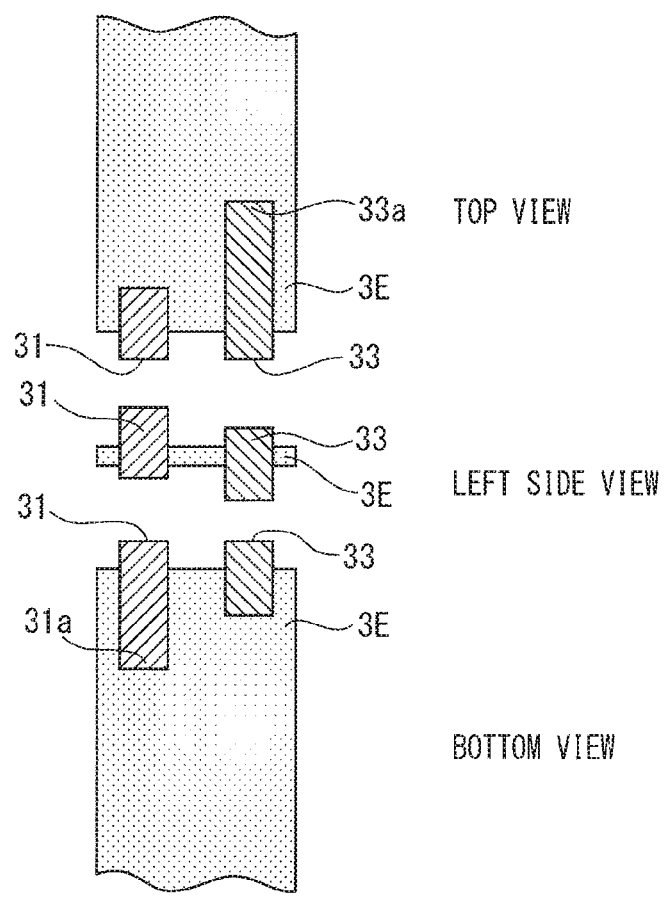
FIG. 4 is a schematic diagram for illustration of the state of the solid electrolyte layer or separator after inserting the collecting member.

FIG. 4 shows an external view of an extension of the solid electrolyte layer or extension of the separator 3E after a negative electrode collecting member 31 and positive electrode collecting member 33 have been fitted. The "bottom view" in FIG. 4 is the side where the extension of the negative electrode collector layer 1E is present, and the "top view" is the side where the extension of the positive electrode collector layer 5E is present. Referring to the "left side view", the negative electrode collecting member 31 is designed to be relatively long and thin on the "bottom view" side, which is the side where the extension of the negative electrode collector layer 1E is present, and designed to be relatively short and thick on the "top view" side, which is the side where the extension of the positive electrode collector layer 5E is present. The positive electrode collecting member 33 is designed to be relatively short and thick on the "bottom view" side, which is the side where the extension of the negative electrode collector layer 1E is present, and designed to be relatively long and thin on the "top view" side, which is the side where the extension of the positive electrode collector layer 5E is present.

As a different step from the above, a negative electrode active material layer 2 is formed on each of both sides of the negative electrode collector layer 1 to form a negative electrode stack 15, and a positive electrode active material layer 4 is formed on each of both sides of the positive electrode collector layer 5 to form a positive electrode stack 16 (FIG. 2). These steps may be carried out by a publicly known method, or by adding appropriate modifications to such a method.

The desired stacked-cell battery 501 can be obtained by stacking the solid electrolyte layer or separator 3 with a negative electrode collecting member 31 and a positive electrode collecting member 33, the negative electrode stack 15, the solid electrolyte layer or separator 3 with a negative electrode collecting member 31 and positive electrode collecting member 33, and the positive electrode stack 16 which are obtained by the method above, in that order.

The stacking of each layer may be done in such a manner that the negative electrode collecting member 31 is in contact with an extension of the negative electrode collector layer 1E and another negative electrode collecting member 31 adjacent to it in the stacking direction, and not in contact with the extension of the positive electrode collector layer 5E (see FIG. 2). Similarly, the stacking of each layer may be done in such a manner that the positive electrode collecting member 33 is in contact with an extension of the positive electrode collector layer 5E and another positive electrode collecting member 33 adjacent to it in the stacking direction, and not in contact with the extension of the negative electrode collector layer 1E.

The method for producing a stacked-cell battery according to the first embodiment as explained above is advantageous in that it is sufficient to use one type of collecting member each for the positive electrode and negative electrode.

Second Embodiment

Figure 5A:
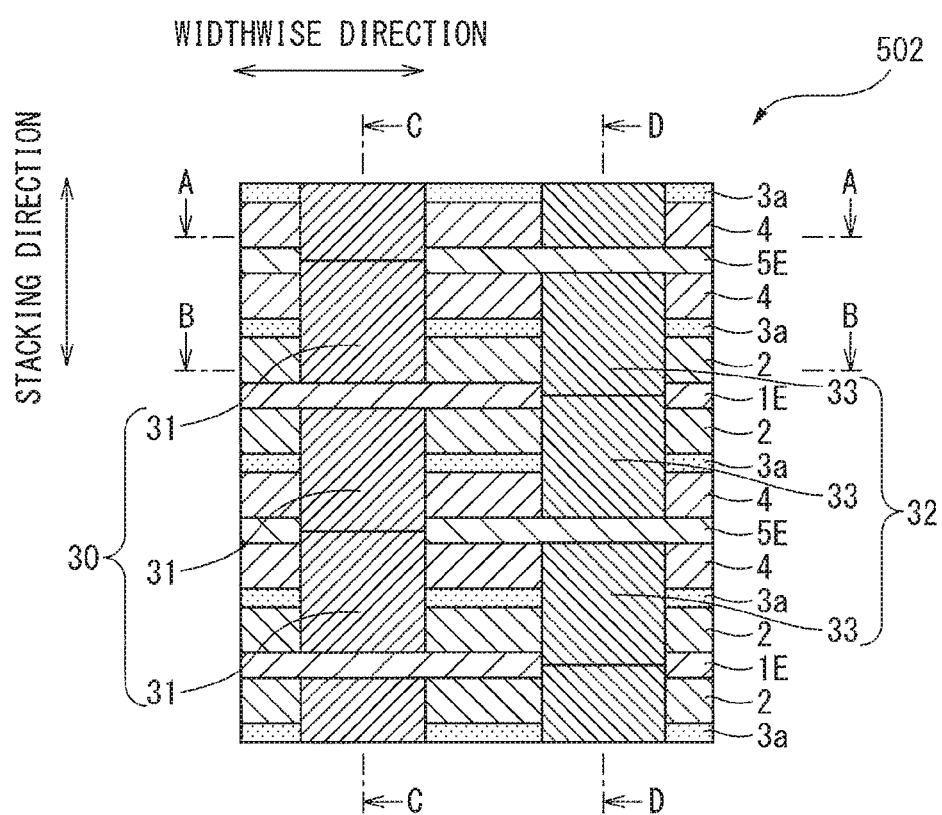
FIG. 5A is a schematic diagram for illustration of another example of an embodiment of the stacked-cell battery of the disclosure.
Figure 5B:
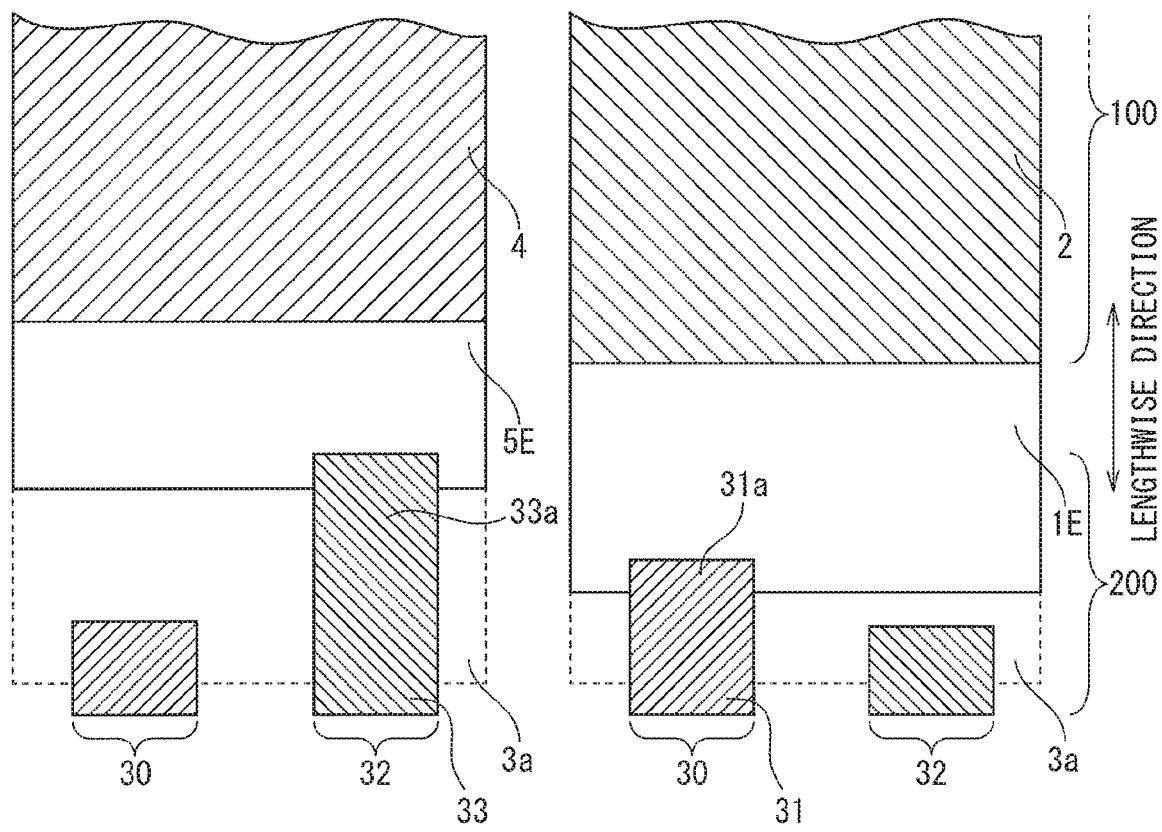
FIG. 5B shows a cross-sectional view along line A-A and a cross-sectional view along line B-B of FIG. 5A.
Figure 5C:
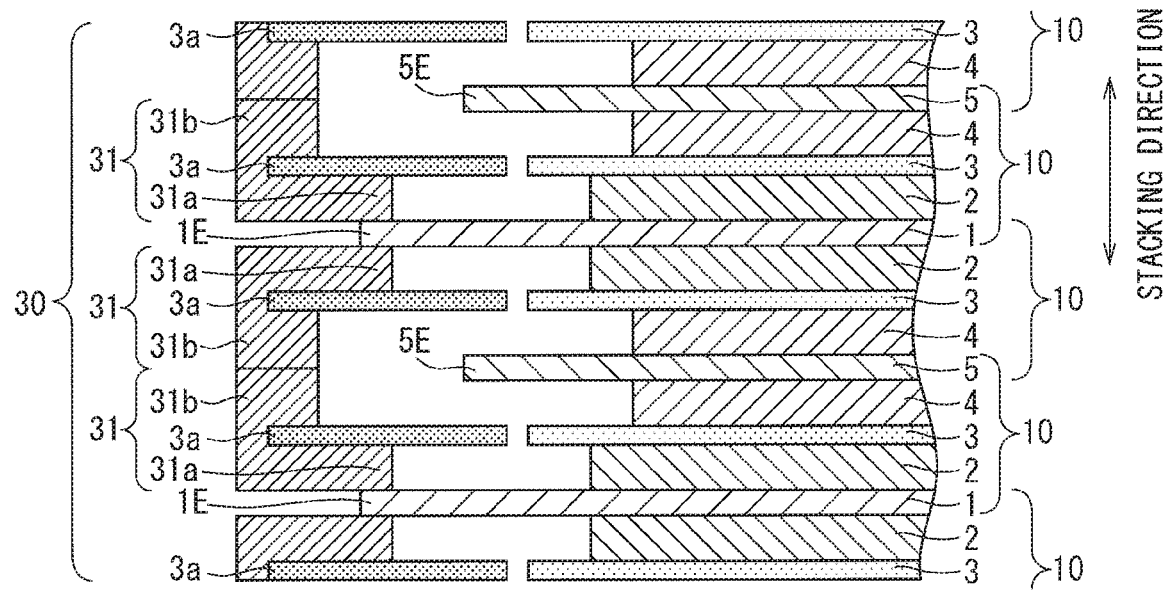
FIG. 5C shows a cross-sectional view along line C-C and a cross-sectional view along line D-D of FIG. 5A.
Figure 5C:
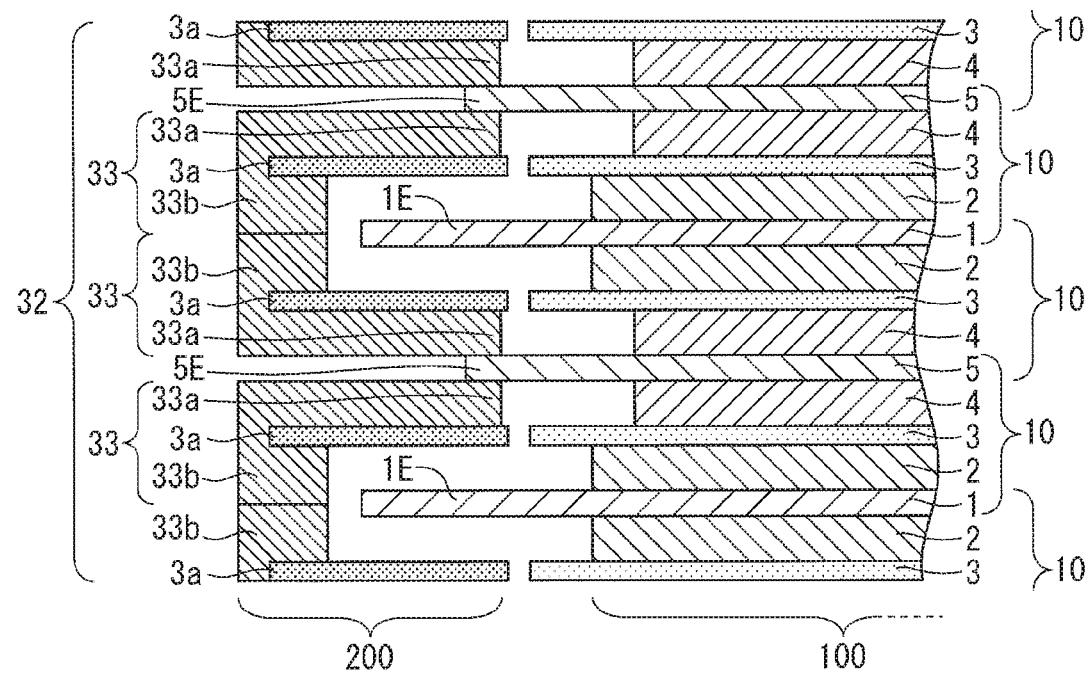

Another example of a typical construction of this embodiment of the stacked-cell battery is shown in FIGS. 5A to C. FIG. 5A is a diagram of a stacked-cell battery 502 as seen from the collection region side in the lengthwise direction, FIG. 5B is a cross-sectional view along line A-A and a cross-sectional view along line B-B of FIG. 5A, and FIG. 5C is a cross-sectional view along line C-C and a cross-sectional view along line D-D of FIG. 5A.

The stacked-cell battery 502 has, as viewed from the stacking direction and the widthwise direction, a cell region 100, and a collection region 200 that are adjacent in the lengthwise direction of the cell region (FIG. 5B and FIG. 5C).

The stacked-cell battery 502 comprises, in the cell region 100, a plurality of unit cells 10 each having, stacked in order, a negative electrode collector layer 1, a negative electrode active material layer 2, a solid electrolyte layer or separator 3, a positive electrode active material layer 4 and a positive electrode collector layer 5 (FIG. 5C).

The construction of the cell region 100 of the stacked-cell battery 502 may be the same as the stacked-cell battery 501.

However, the stacked-cell battery 502 differs from the stacked-cell battery 501 in that each solid electrolyte layer or separator 3 does not extend from the cell region 100 to the collection region 200, and in the collection region 200, it has an insulating sheet 3a instead of the extension of the solid electrolyte layer or the extension of the separator. The rest of the construction of the collection region 200 may be the same as the stacked-cell battery 501.

Each insulating sheet 3a in the collection region 200 of the stacked-cell battery 502 has its end on the side opposite from the cell region 100 in the lengthwise direction anchored to either or both, and preferably both, the negative electrode collecting section 30 and positive electrode collecting section 32.

In the collection region 200 of the stacked-cell battery 502, each insulating sheet 3a may be present between the extension of the negative electrode collector layer 1E and the extension of the positive electrode collector layer 5E, in the stacking direction. Such a construction will facilitate production of the stacked-cell battery 502 while helping to avoid short circuiting between the positive and negative electrodes.

The insulating sheets 3a to be used in the stacked-cell battery 502 may be composed of the same material as the solid electrolyte layers or separators, or they may be composed of different materials such as polyimide or polyethylene terephthalate (PET), for example. The length of each insulating sheet 3a in the stacking direction may be, or may not be, approximately the same as the lengths of the solid electrolyte layers or separators 3 in the stacking direction. The length of each insulating sheet 3a in the stacking direction is preferably approximately the same as the lengths of the solid electrolyte layers or separators 3 in the stacking direction.

In the stacked-cell battery 502, the length of the collection region 200 in the stacking direction and the length of the cell region 100 in the stacking direction are approximately equal. However, the lengths may be different instead.

The length of the collection region 200 in the stacking direction and the length of the cell region 100 in the stacking direction are preferably approximately equal in the stacked-cell battery 502. Such a mode will not require the extensions of the negative electrode collector layers 1E and the extensions of the positive electrode collector layers 5E to be bent between the collection regions 200 and the cell regions 100, allowing inconveniences such as breakage of these layers to be more reliably prevented. Furthermore, it will not be necessary to provide spaces between the collection region 200 and cell region 100 in order to bend the extensions of the negative electrode collector layers 1E and the extensions of the positive electrode collector layers 5E, thereby allowing the volume of the obtained stacked-cell battery 502 to be reduced.

Figure 6:
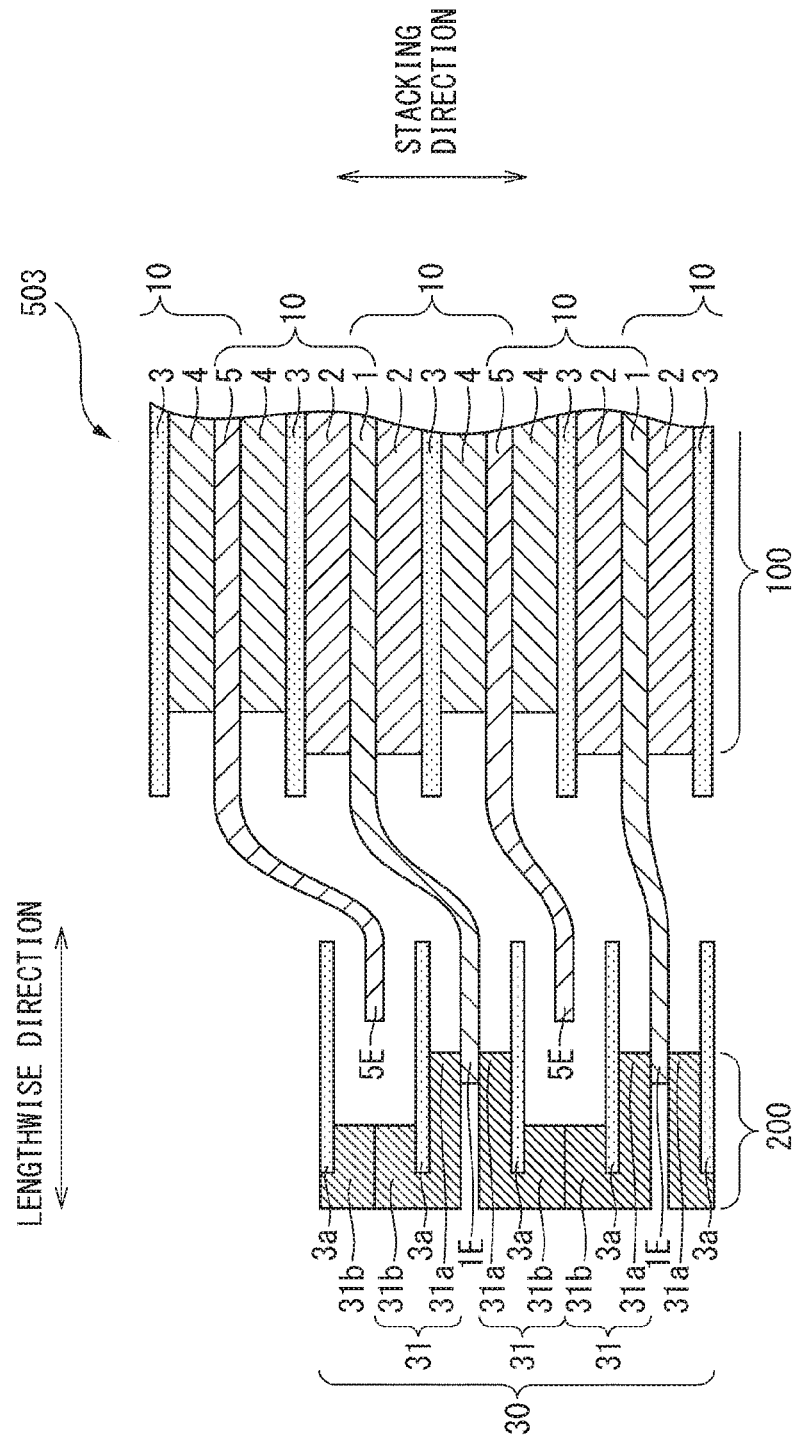
FIG. 6 is a schematic diagram for illustration of yet another example of an embodiment of the stacked-cell battery of the disclosure.

FIG. 6 shows a stacked-cell battery 503 wherein the length of the collection region 200 in the stacking direction is shorter than the length of the cell region 100 in the stacking direction, in a cross-sectional view parallel to the lengthwise direction and the stacking direction, and cut on a plane that includes a negative electrode collecting section 30. The negative electrode collector layer 1 of the stacked-cell battery 503 is bent at the portion extended from the cell region 100 to the collection region 200, and is electrically connected with the negative electrode collecting member 31. The positive electrode collector layer 5 is also bent at the portion extended from the cell region 100 to the collection region 200, and is electrically connected with the positive electrode collecting member 33.

The structure and function of each negative electrode collecting member 31 and positive electrode collecting member 33 in the stacked-cell battery 503 are essentially the same as the negative electrode collecting member 31 and positive electrode collecting member 33 in the stacked-cell battery 502.

The stacked-cell battery 503 may have freely selected lengths for the negative electrode collecting member 31 and positive electrode collecting member 33 in the stacking direction. The stacked-cell battery 503 therefore has high productivity.

<Method for Producing Stacked-Cell Battery According to Second Embodiment>

The stacked batteries 502 and 503 can be produced by the following method, for example.

A method for producing a stacked-cell battery comprising a plurality of unit cells that are stacked, each having a negative electrode collector layer, a negative electrode active material layer, a solid electrolyte layer or separator, a positive electrode active material layer and a positive electrode collector layer stacked in that order, wherein a negative electrode collecting member and a positive electrode collecting member are fitted at the end of an insulating sheet different from the solid electrolyte layer or separator, and an insulating sheet with a collecting member is obtained, a negative electrode active material layer is formed on both sides of each negative electrode collector layer to obtain a negative electrode stack, a positive electrode active material layer is formed on both sides of each positive electrode collector layer to obtain a positive electrode stack, and the solid electrolyte layer or separator, the negative electrode stack, the solid electrolyte layer or separator and the positive electrode stack are stacked in that order to construct a cell region, and the insulating sheet with a collecting member, the extension of the negative electrode collector layer in the negative electrode stack, the insulating sheet with a collecting member and the extension of the positive electrode collector layer in the positive electrode stack are stacked in that order to construct a collection region.

Figure 7:
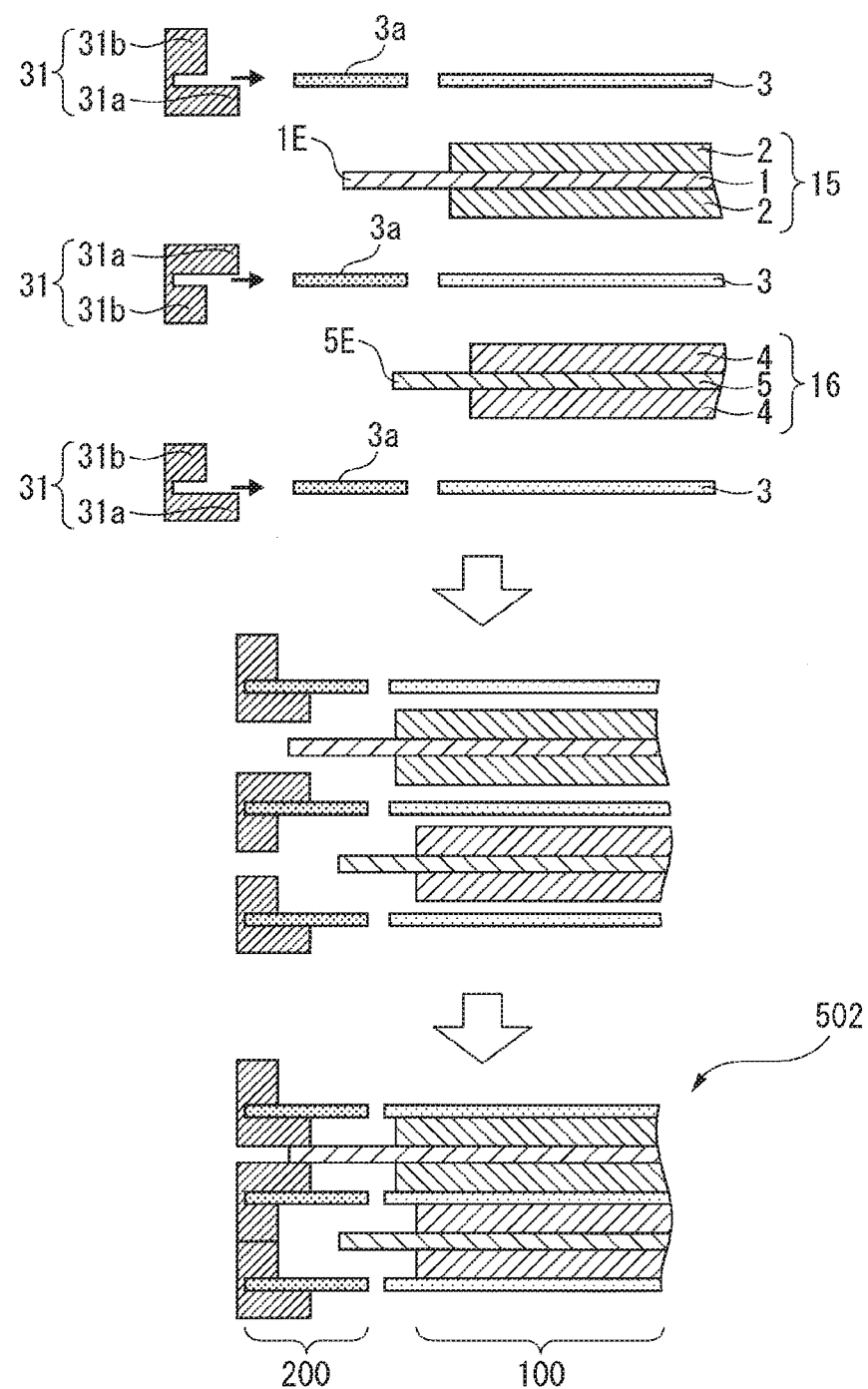
FIG. 7 is a schematic diagram for illustration of another example of the method for producing a stacked-cell battery of the disclosure.

This production method may be carried out by the steps illustrated in FIG. 7, for example. FIG. 7 shows a production procedure for the stacked-cell battery 502, in a cross-sectional view parallel to the lengthwise direction and the stacking direction, and cut on a plane that includes a negative electrode collecting section 30. The stacked-cell battery 503 may be produced by essentially the same method as the method shown in FIG. 7 except for setting the length of the collection region 200 in the stacking direction to be shorter than the length of the cell region 100 in the stacking direction.

The negative electrode collecting member 31 and positive electrode collecting member 33 are fitted at the ends of the insulating sheet 3a. The insulating sheet 3a differs from the solid electrolyte layer or separator 3 composing the cell region 100 of the stacked-cell battery 502. The material of the insulating sheet 3a may be of the same type as that of the solid electrolyte layer or separator, or of a different type. The insulating sheet 3a may be composed of polyimide or polyethylene terephthalate (PET), for example.

The length of each insulating sheet 3a in the stacking direction may be, or may not be, approximately the same as the lengths of the solid electrolyte layers or separators 3 in the stacking direction.

The collecting members of the positive and negative electrodes, and the mode in which the collecting members are fitted, may be the same as for the negative electrode collecting member 31 and positive electrode collecting member 33 in the method for producing the stacked-cell battery of the first embodiment.

Figure 8:
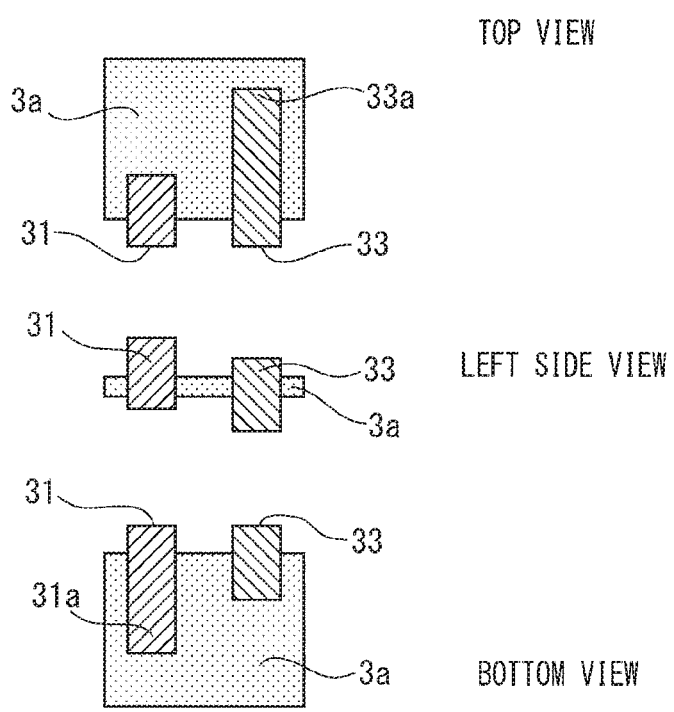
FIG. 8 is a schematic diagram for illustration of the state of an insulating sheet after inserting the collecting member.

FIG. 8 shows an outer view of the insulating sheet 3a after the negative electrode collecting member 31 and positive electrode collecting member 33 have been fitted. Referring to the "left side view", the negative electrode collecting member 31 is designed to be relatively long and thin on the "bottom view" side, which is the side where the extension of the negative electrode collector layer 1E is present, and designed to be relatively short and thick on the "top view" side, which is the side where the extension of the positive electrode collector layer 5E is present. The positive electrode collecting member 33 is designed to be relatively short and thick on the "bottom view" side, which is the side where the extension of the negative electrode collector layer 1E is present, and designed to be relatively long and thin on the "top view" side, which is the side where the extension of the positive electrode collector layer 5E is present.

Formation of the negative electrode stack 15 and positive electrode stack 16 may each be carried out in the same manner as in the method for producing the stacked-cell battery of the first embodiment (FIG. 7).

In addition, the desired stacked-cell battery 502 can be obtained by stacking the solid electrolyte layer or separator 3, the negative electrode stack 15, the solid electrolyte layer or separator 3 and the positive electrode stack 16 in that order, to construct the cell region, and stacking the insulating sheet with a collecting member 3a, the extension of the negative electrode collector layer 1E in the negative electrode stack 15, the insulating sheet with a collecting member 3a and the extension of the positive electrode collector layer 5E in the positive electrode stack 16 in that order, to construct the collection region.

Either the stacking step in which the cell region 100 is obtained or the stacking step in which the collection region 200 is obtained may be carried out first, or they may be carried out simultaneously.

The stacked-cell battery 503 may be produced by essentially the same method as the method for producing the stacked-cell battery 502 except for setting the length of the collection region 200 in the stacking direction to be shorter than the length of the cell region 100 in the stacking direction.

<Variations for Collection Region>

[Variation 1]

The construction of the collection region 200 in the stacked batteries 501 to 503 is a construction in which the individual negative electrode collecting members 31 and positive electrode collecting members 33 are each electrically connected by being connected in the stacking direction on the outsides of the ends on the side of the extension of the solid electrolyte layer or extension of the separator 3E opposite from the cell region 100, in the lengthwise direction. The construction for electrically connecting the individual negative electrode collecting members 31 and positive electrode collecting members 33 on the fronts and backs of the extensions of the solid electrolyte layers or extension of the separators 3E is not limited to the construction described for the stacked batteries 501 to 503, and may be a different construction instead.

Figure 9A:
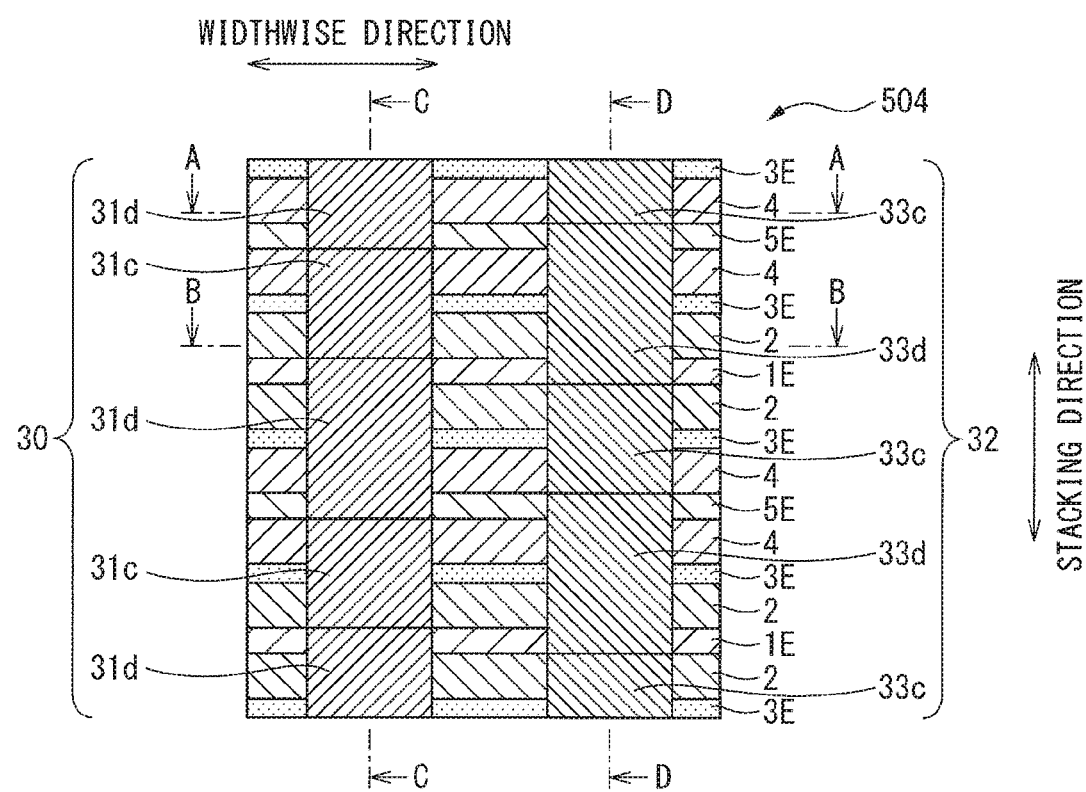
FIG. 9A is a schematic diagram for illustration of yet another example of an embodiment of the stacked-cell battery of the disclosure.
Figure 9B:
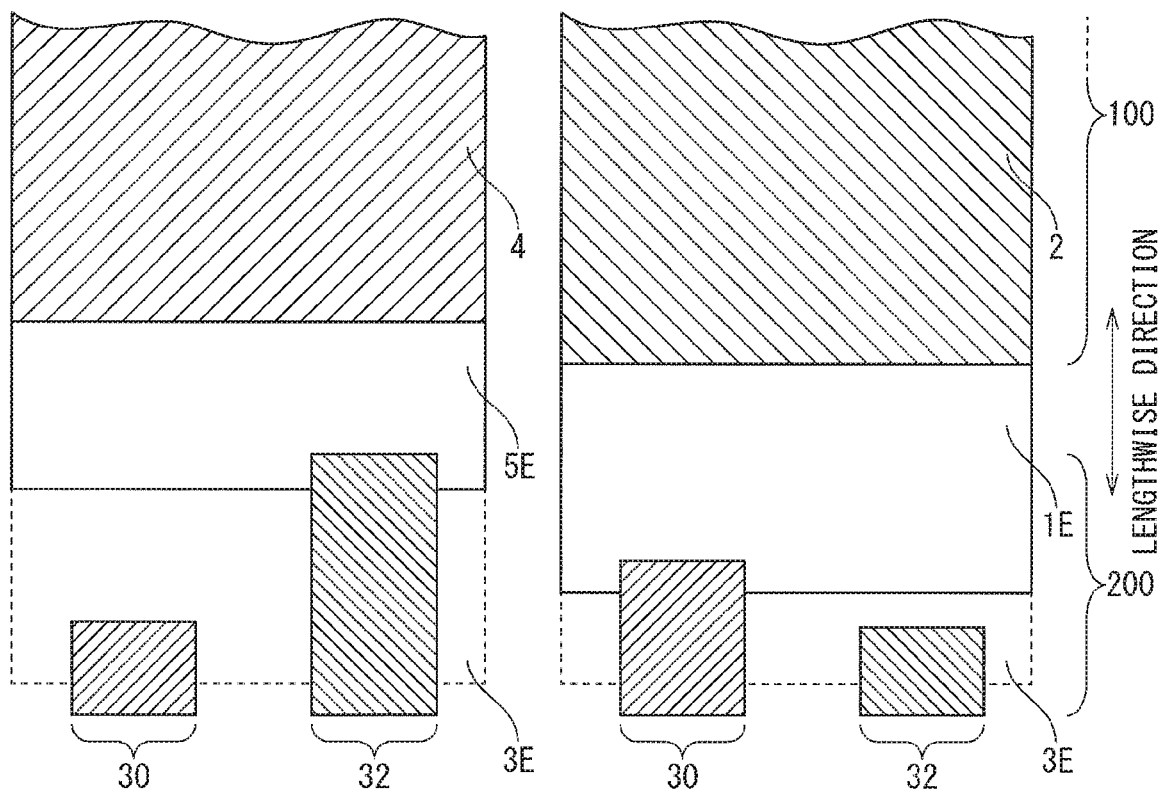
FIG. 9B shows a cross-sectional view along line A-A and a cross-sectional view along line B-B of FIG. 9A.
Figure 9C:
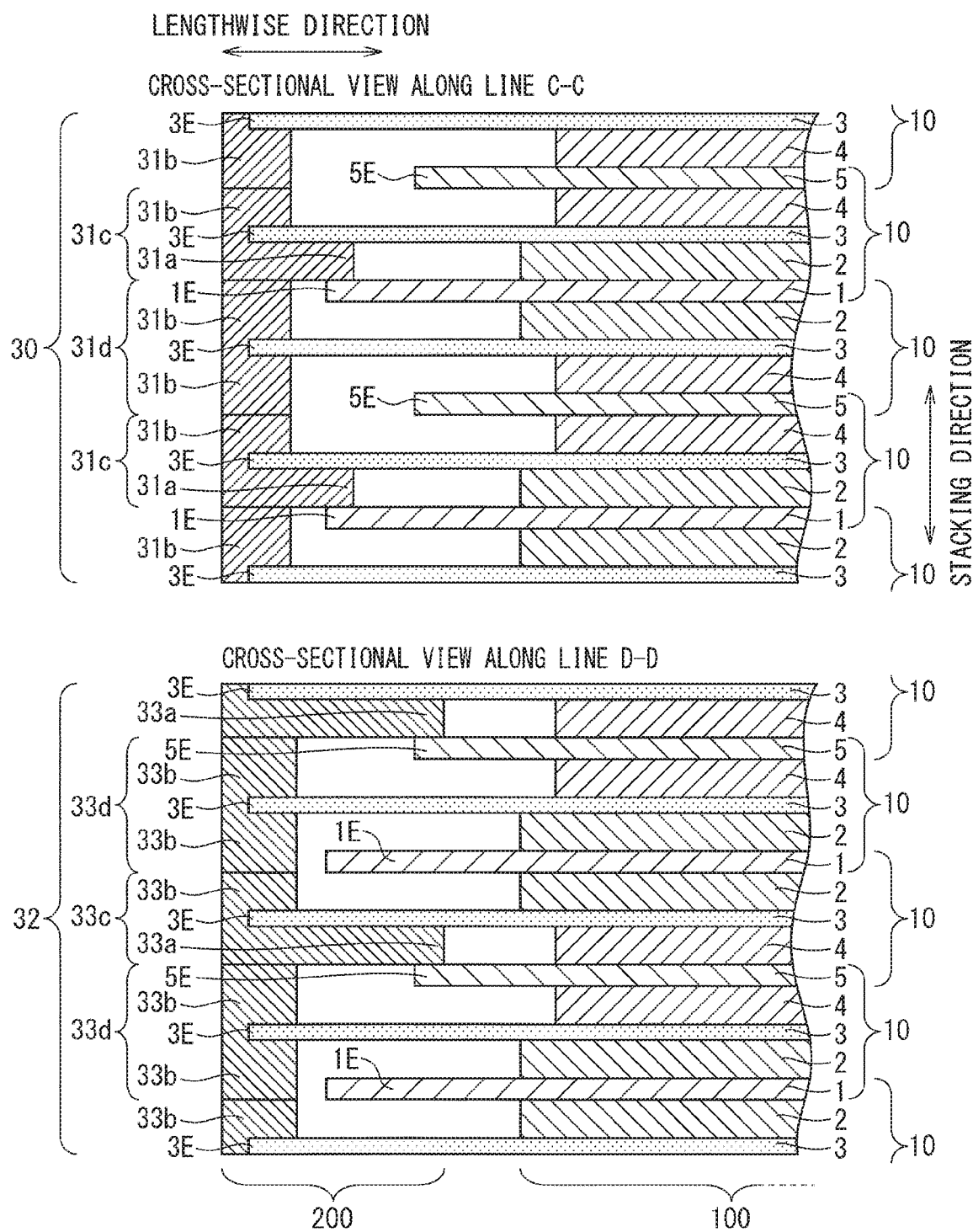
FIG. 9C shows a cross-sectional view along line C-C and a cross-sectional view along line D-D of FIG. 9A.

FIG. 9A to FIG. 9C show a construction for the stacked-cell battery 504. The stacked-cell battery 504 is an embodiment different from the stacked batteries 501 to 503, having a construction in which the individual negative electrode collecting members and positive electrode collecting members are each connected on the outsides of the ends on the sides of the extensions of the solid electrolyte layers or the extensions of the separators opposite from the cell region, in the lengthwise direction. FIG. 9A is a diagram of the stacked-cell battery 504 as seen from the collection region side in the lengthwise direction, FIG. 9B is a cross-sectional view along line A-A and a cross-sectional view along line B-B of FIG. 9A, and FIG. 9C is a cross-sectional view along line C-C and a cross-sectional view along line D-D of FIG. 9A.

These diagrams are examples where the collection region 200 has an extension of the solid electrolyte layer or extension of the separator 3E. However, it is to be understood that this disclosure likewise includes cases where, instead of the extension of the solid electrolyte layer or the extension of the separator, the collection region has a separate insulating sheet.

The stacked-cell battery 504, as viewed from the stacking direction, has a cell region 100, and a collection region 200 adjacent in the lengthwise direction of the cell region (FIG. 9B). The construction of the cell region 100 of the stacked-cell battery 504 may be the same as the stacked-cell battery 501.

When the stacked-cell battery 504 is viewed from the stacking direction, the negative electrode collecting section 30 and the positive electrode collecting section 32 are at the end of the collection region 200 opposite from the cell region 100, and are mutually separated in the widthwise direction by spacings between them (FIG. 9B).

In the stacked-cell battery 504, the extension of the solid electrolyte layer or extension of the separator 3E have their ends on the side opposite from the cell region 100 in the lengthwise direction anchored to either or both, and preferably both, the negative electrode collecting section 30 and positive electrode collecting section 32. In the collection region 200 of the stacked-cell battery 504, each extension of the solid electrolyte layer or extension of the separator 3E may be present between each of the extensions of the negative electrode collector layer 1E and the extensions of the positive electrode collector layer 5E (FIG. 9C), in the stacking direction.

The negative electrode collecting section 30 is connected to each of the extensions of the negative electrode collector layers 1E in the plurality of unit cells 10, and electrically connects the extensions of the negative electrode collector layers 1E of the plurality of unit cells 10 together.

Each negative electrode collecting section 30 may be composed of a plurality of negative electrode collecting members 31c and a plurality of negative electrode collecting members 31d. Each negative electrode collecting member 31c may have an in-plane direction region 31a, extending in the lengthwise direction, and a stacking direction region 31b, extending in the stacking direction. Each negative electrode collecting member 31d may have only a stacking direction region 31b extending in the stacking direction, without having an in-plane direction region 31a extending in the lengthwise direction.

The in-plane direction region 31a of the negative electrode collecting member 31c is situated on the side of the extension of the solid electrolyte layer or extension of the separator 3E where the extension of the negative electrode collector layer 1E is present, and is not situated on the side where the extension of the positive electrode collector layer 5E is present (FIG. 9C, cross-sectional view along line C-C).

Since the in-plane direction region 31a of the negative electrode collecting member 31c is situated on the side of the extension of the solid electrolyte layer or extension of the separator 3E where the extension of the negative electrode collector layer 1E is present, the negative electrode collecting member 31c and the extension of the negative electrode collector layer 1E are electrically connected (see cross-sectional view along line B-B of FIG. 9B, and cross-sectional view along line C-C of FIG. 9C). On the other hand, since the in-plane direction region 31a of the negative electrode collecting member 31c is not situated on the side of the extension of the solid electrolyte layer or extension of the separator 3E where the extension of the positive electrode collector layer 5E is present, the negative electrode collecting member 31c and the extension of the positive electrode collector layer 5E are not electrically connected (see cross-sectional view along line A-A of FIG. 9B and cross-sectional view along line C-C of FIG. 9C).

This may be achieved by appropriately setting the respective sizes of the negative electrode collecting members 31c and 31d.

For example, the length of each negative electrode collecting member 31c in the lengthwise direction may be long enough so that it reaches and can be electrically connected to the extension of the negative electrode collector layer 1E, on the side of the extension of the solid electrolyte layer or extension of the separator 3E where the extension of the negative electrode collector layer 1E is present (cross-sectional view along line B-B in FIG. 9B), and short enough so that it does not reach the extension of the positive electrode collector layer 5E on the side where the extension of the positive electrode collector layer 5E is present (cross-sectional view along line A-A in FIG. 9B).

The length of each negative electrode collecting member 31d in the lengthwise direction may be short enough so that it does not reach the extension of the positive electrode collector layer 5E, on the side of the extension of the solid electrolyte layer or extension of the separator 3E where the extension of the positive electrode collector layer 5E is present (cross-sectional view along line A-A in FIG. 9B). The length of each negative electrode collecting member 31d in the lengthwise direction may also reach to the end of the extension of the negative electrode collector layer 1E, on the side of the extension of the solid electrolyte layer or extension of the separator 3E where the extension of the negative electrode collector layer 1E is present, but this is not necessary. The lengths of the negative electrode collecting members 31d of the stacked-cell battery 504 in the lengthwise direction are approximately the same on both sides of the extension of the solid electrolyte layer or extension of the separator 3E. In this case, each extension of the negative electrode collector layer 1E may be electrically connected to one negative electrode collecting member 31c on one side, and not electrically connected to the negative electrode collecting member on the back side.

Also, the negative electrode collecting member 31c and negative electrode collecting member 31d are disposed in an alternating fashion in the stacking direction, and are directly connected to their respective adjacent negative electrode collecting members, thereby forming electrical connection between the plurality of negative electrode collecting members 31c and 31d. Moreover, as explained above, each of the extensions of the negative electrode collector layers 1E are electrically connected on one side by the negative electrode collecting members 31c. This results in electrical connection between the extensions of the negative electrode collector layers 1E of the plurality of unit cells 10 in the stacked-cell battery 504.

In order to achieve such electrical connection, the lengths of each of the negative electrode collecting members 31c in the stacking direction may be set to lengths so that they are in direct contact with the negative electrode collecting member 31d that is adjacent in the stacking direction, on the side of the extension of the solid electrolyte layer or extension of the separator 3E where the extension of the positive electrode collector layer 5E is present, and set to lengths so that the sides of the in-plane direction regions 31a of the negative electrode collecting member on the lower side as depicted in FIG. 9C are in contact with the upper sides of the extension of the negative electrode collector layers 1E, on the sides where the extensions of the negative electrode collector layers 1E are present. The lengths of the negative electrode collecting members 31d in the stacking direction may be set to lengths such that they contact with the adjacent negative electrode collecting members 31c on both the sides of the extensions of the solid electrolyte layers or extensions of the separators 3E, where the extensions of the positive electrode collector layers 5E are present and where the extensions of the negative electrode collector layers 1E are present.

The positive electrode collecting section 32 will be easily understood by reversing the positive and negative electrodes in the above explanation of the negative electrode collecting section 30. That is, the positive electrode collecting sections 32 are connected to the extensions of the positive electrode collector layers 5E of the plurality of unit cells 10, and electrically connects the extensions of the positive electrode collector layers 5E of the plurality of unit cells 10 together, but they are not connected to the extensions of the negative electrode collector layers 1E. Each positive electrode collecting section 32 may be composed of a plurality of positive electrode collecting members 33c and a plurality of positive electrode collecting members 33d. The sizes of each of the positive electrode collecting members may be appropriately set with the same considerations as for setting the sizes of the negative electrode collecting members 31c and 31d.

[Method for Producing Stacked-Cell Battery with Collection Region According to Variation 1]

The stacked-cell battery 504 may be produced by the following method, as an example.

A method for producing a stacked-cell battery comprising a plurality of unit cells that are stacked, the unit cells comprising a negative electrode collector layer, a negative electrode active material layer, a solid electrolyte layer or a separator, a positive electrode active material layer and a positive electrode collector layer stacked in that order, comprising:

fitting a first negative electrode collecting member and a second positive electrode collecting member at an end of the solid electrolyte layer or the separator, and obtaining a first solid electrolyte layer or separator with a collecting member, fitting a second negative electrode collecting member and a first positive electrode collecting member at the end of the solid electrolyte layer or separator different from the first solid electrolyte layer or separator with a collecting member, and obtaining a second solid electrolyte layer or separator with a collecting member, forming a negative electrode active material layer on both sides of the negative electrode collector layer to obtain a negative electrode stack, forming a positive electrode active material layer on both sides of the positive electrode collector layer to obtain a positive electrode stack, and stacking the first solid electrolyte layer or separator with a collecting member, the negative electrode stack, the second solid electrolyte layer or separator with a collecting member, and the positive electrode stack, in that order to obtain a stacked-cell battery, the first negative electrode collecting member and first positive electrode collecting member comprising in-plane direction regions that extend in the lengthwise direction of the stacked-cell battery, and the second negative electrode collecting member and second positive electrode collecting member comprising stacking direction regions that extend in the stacking direction of the stacked-cell battery.

Figure 10:
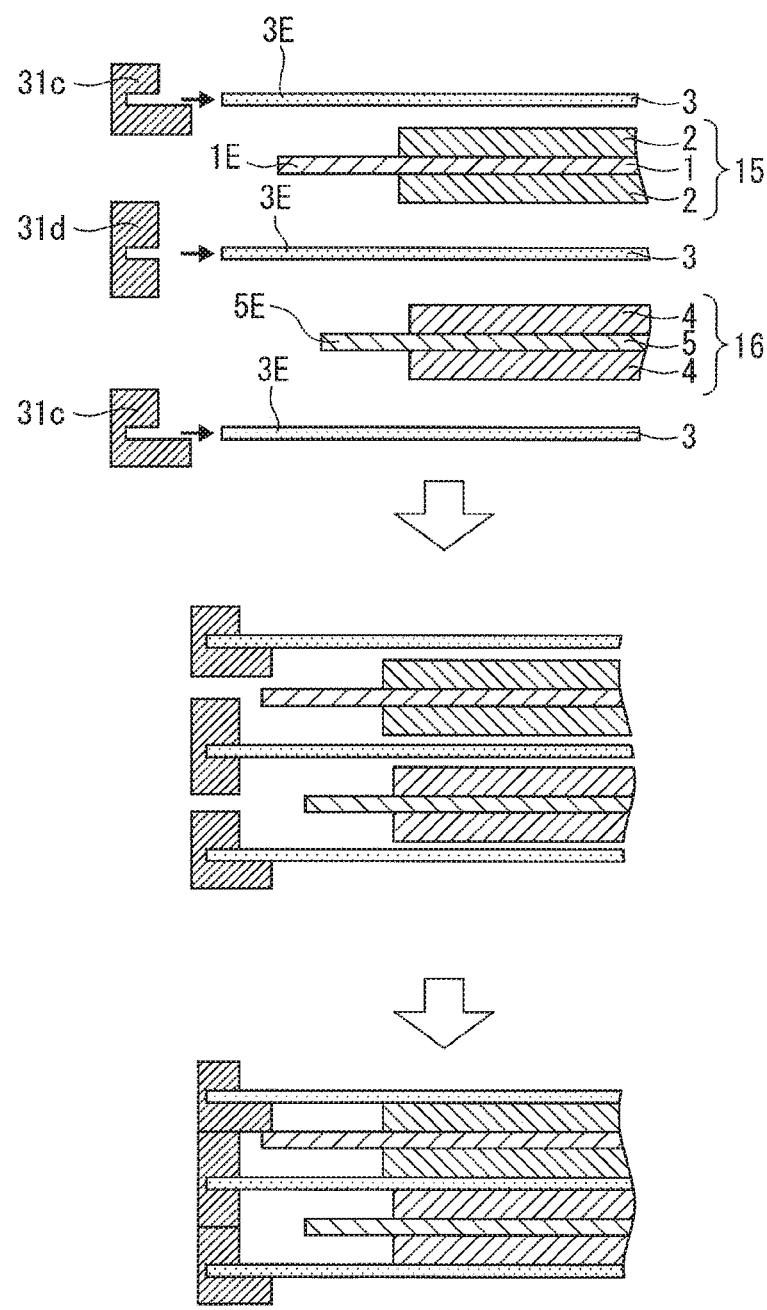
FIG. 10 is a schematic diagram for illustration of yet another example of the method for producing a stacked-cell battery of the disclosure.

This method may be carried out in the same manner as for production of the stacked-cell battery 501 described above, except for the following change to the positive electrode collecting members and negative electrode collecting members used. Specifically, it may be produced by the procedure illustrated in FIG. 10, as an example. FIG. 10 shows a production procedure for the stacked-cell battery 504, in a cross-sectional view parallel to the lengthwise direction and the stacking direction, and cut on a plane that includes a negative electrode collecting section 30.

In the production method of FIG. 10, two different types of negative electrode collecting members 31c and 31d are used, and when forming the stacked-cell battery, the negative electrode collecting members are combined to construct the negative electrode collecting section 30. Similarly, for the positive electrode, two different positive electrode collecting members are used, and when forming the stacked-cell battery, the positive electrode collecting members are combined to construct the positive electrode collecting section.

The first negative electrode collecting member includes an in-plane direction region extending in the lengthwise direction of the stacked-cell battery, and the first positive electrode collecting member includes an in-plane direction region extending in the lengthwise direction of the stacked-cell battery. The second negative electrode collecting member includes a stacking direction region extending in the stacking direction of the stacked-cell battery, and the second positive electrode collecting member includes a stacking direction region extending in the stacking direction of the stacked-cell battery.

Figure 11:
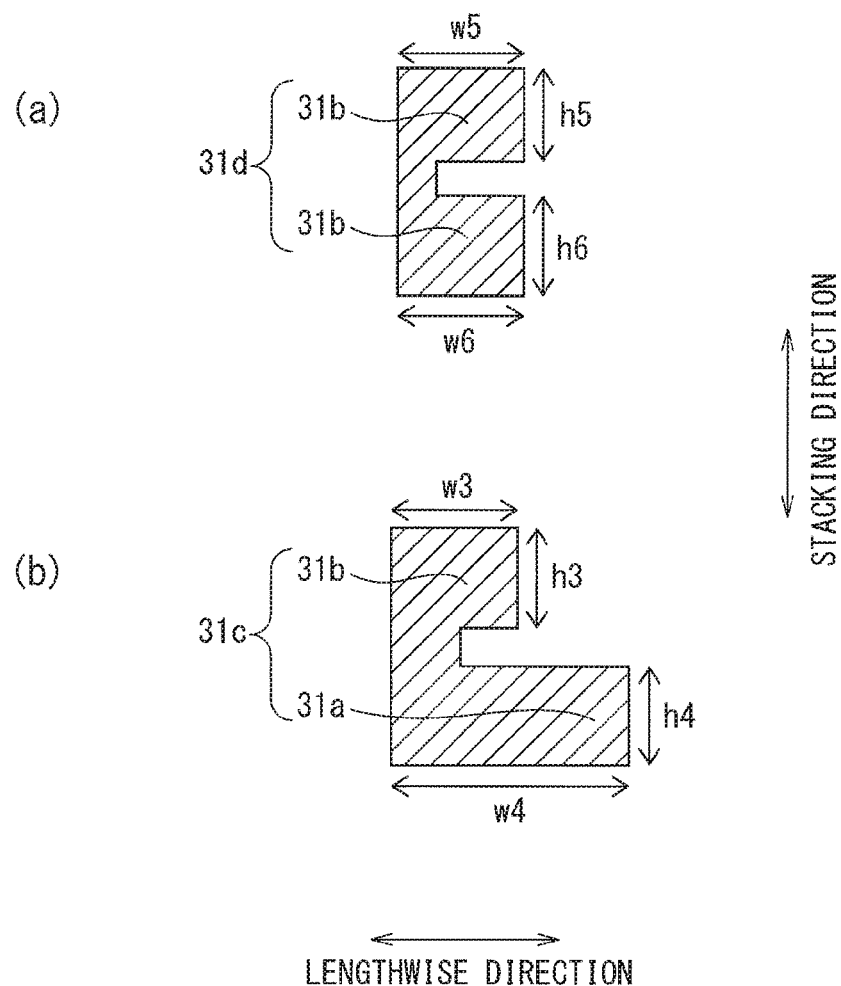
FIG. 11 is a magnified view of a collecting member used in the production method illustrated in FIG. 10.

Examples of these collecting member parts are shown in FIG. 11, as examples of negative electrode collecting member parts.

FIG. 11(b) is the first negative electrode collecting member 31c. The first negative electrode collecting member 31c has longer shape for the bottom side length w4 than the top side length w3, in terms of the vertical relationship in FIG. 11(b). In the first negative electrode collecting member 31c, the portion containing bottom side w4 which is longer than w3 forms an in-plane direction region 31a extending in the lengthwise direction of the stacked-cell battery.

FIG. 11(a) is a second negative electrode collecting member 31d. The top side length w5 and bottom side length w6 of the second negative electrode collecting member 31d are approximately the same. When made into a stacked-cell battery, the entire negative electrode collecting member 31d forms a negative electrode collecting section stacking direction region 31b extending in the stacking direction of the stacked-cell battery.

In the subsequent stacking step, the first negative electrode collecting member 31c is disposed so that so that the bottom side end of itself (the negative electrode collecting section in-plane direction region 31a) faces the side where the extension of the negative electrode collector layer 1E is present, and the top side end of itself faces the side where the extension of the positive electrode collector layer 5E is present. Thus, the bottom side length w4 of the first negative electrode collecting member 31c may be a length such that, after it has been fitted on the end of the extension of the solid electrolyte layer or extension of the separator 3E to form the stacked-cell battery, the end of the in-plane direction region 31a of the first negative electrode collecting member 31c can contact the extension of the negative electrode collector layer 1E. Once the stacked-cell battery has been assembled, the bottom side of the first negative electrode collecting member 31c and the extension of the negative electrode collector layer 1E may be overlapped in the in-plane direction. The top side length w3 may be a length such that after the stacked-cell battery has been assembled, the first negative electrode collecting member 31c does not contact with the extension of the positive electrode collector layer 5E. The top side length w3 and the bottom side length w4 do not necessarily need to satisfy the relationship w3<w4.

In the subsequent stacking step, the top side and bottom side of the second negative electrode collecting member 31d may be disposed either facing the side where the extension of the negative electrode collector layer 1E is present or the side where the extension of the positive electrode collector layer 5E is present. For convenience of illustration, here it is disposed with the top side end of the second negative electrode collecting member 31d oriented toward the side where the extension of the negative electrode collector layer 1E is present, and the bottom side end oriented toward the side where the extension of the positive electrode collector layer 5E is present.

The top side length w5 that is to be disposed on the side where the extension of the negative electrode collector layer 1E is present may have any value, among the sides of the second negative electrode collecting member 31d. For this embodiment, however, it is expected that the first negative electrode collecting member 31c and the second negative electrode collecting member 31d will also be in direct contact on the side where the extension of the negative electrode collector layer 1E is present, and not through the extension of the negative electrode collector layer 1E. Therefore, the top side length w5 of the second negative electrode collecting member 31d may be of a length such that it does not overlap with the extension of the negative electrode collector layer 1E in the in-plane direction, in the lengthwise direction after the stacked-cell battery has been assembled. The bottom side length w6 situated on the side where the extension of the positive electrode collector layer 5E is present may be a length such that, after the stacked-cell battery has been assembled, it does not contact with the extension of the positive electrode collector layer 5E.

So long as this condition is satisfied, the top side length w3 of the first negative electrode collecting member 31c and the lengths of the top side w5 and bottom side w6 of the second negative electrode collecting member 31d may be either the same length or different lengths.

In the subsequent stacking step, the first negative electrode collecting member 31c is disposed so that it is in contact with the extension of the negative electrode collector layer 1E and the second negative electrode collecting member 31d on the bottom side end, and in contact with the second negative electrode collecting member 31d on the top side end. With such a contacting structure, the first negative electrode collecting member 31c and the second negative electrode collecting member 31d will be electrically connected in the stacking direction. Thus, as the negative electrode collecting members at the ends of the extensions of the solid electrolyte layers or extensions of the separators 3E to be stacked, the first negative electrode collecting member 31c and the second negative electrode collecting member 31d may be fitted in an alternating fashion without having their vertical relationship reversed.

In order for the negative electrode collecting members to be electrically connected in a satisfactory manner in the stacking direction after stacking, the total of the length h4 of the first negative electrode collecting member 31c in the stacking direction and the length h5 of the second negative electrode collecting member 31d in the stacking direction may be approximately equal to the spacing between the extensions of the solid electrolyte layers or extensions of the separators 3E that are adjacent in the stacking direction. From the same viewpoint, the total of the length h3 of the first negative electrode collecting member 31c in the stacking direction and the length h6 of the second negative electrode collecting member 31d in the stacking direction may be approximately equal to the spacing between the extensions of the solid electrolyte layers or extensions of the separators 3E that are adjacent in the stacking direction.

Also, if the spacing between the extensions of the solid electrolyte layers or extensions of the separators 3E that are adjacent in the stacking direction is set to be approximately equal on the sides where the extensions of the negative electrode collectors layer 1E are present and sides where the extensions of the positive electrode collector layers 5E are present, then the total value of h4 and h5 can be set equal to the total value of h3 and h6. Furthermore, h3 and h4 may be approximately the same value, and h5 and h6 may be approximately the same value. This mode is preferred from the viewpoint of facilitating production of the first negative electrode collecting member 31c and the second negative electrode collecting member 31d. That is, first negative electrode collecting members 31c can be produced by, for example, cutting and bending metal sheets of a specific thickness in an unordered manner. Also, the second negative electrode collecting members 31d can be produced by, for example, cutting and bending separate metal sheets with different thicknesses than the aforementioned metal sheets, such as metal sheets that are thicker than those metal sheets, in an unordered manner.

Most preferably, the lengths of h3 and h4 are set to be shorter than the lengths of h5 and h6, by the amount of the lengths of the extensions of the negative electrode collector layers in the stacking direction, from the viewpoint of obtaining satisfactory and easy electrical connection in the stacking direction for this mode.

The positive electrode collecting section may be formed using two different types of positive electrode collecting members having essentially the same shapes as the negative electrode collecting members, respectively. The sizes of each of the positive electrode collecting members may be appropriately set with the same considerations as for the negative electrode collecting members.

For the production method of this embodiment, the first negative electrode collecting member and second positive electrode collecting member are fitted at the ends of the solid electrolyte layer or separator, to obtain a first solid electrolyte layer or separator having a collecting member. Also, the second negative electrode collecting member and first positive electrode collecting member are fitted at the ends of a different solid electrolyte layer or separator from the first solid electrolyte layer or separator to obtain a second solid electrolyte layer or separator having a collecting member.

Figure 12:
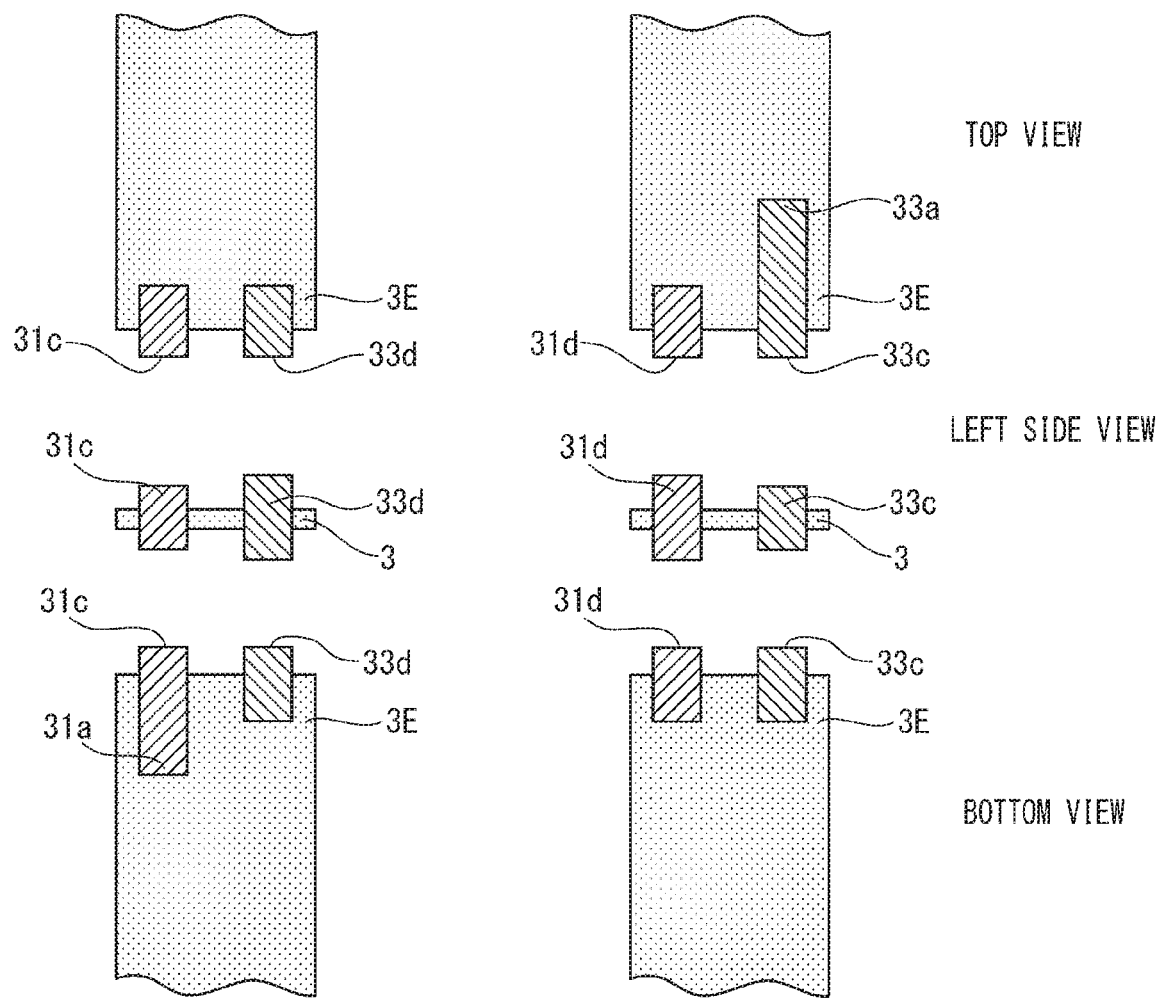
FIG. 12 is a schematic diagram for illustration of the state of a first solid electrolyte layer or separator and a second solid electrolyte layer or separator, after inserting the collecting member.

FIG. 12 shows the shape of the first solid electrolyte layer or separator after the first negative electrode collecting member 31c and second positive electrode collecting member 33d have been fitted, and the shape of the second solid electrolyte layer or separator after the second negative electrode collecting member 31d and first positive electrode collecting member 33c have been fitted. The "top view" is the side where the extension of the positive electrode collector layer is present, and the "bottom view" is the side where the extension of the negative electrode collector layer is present.

The first negative electrode collecting member 31c fitted with the first solid electrolyte layer or separator has the in-plane direction region 31a on one side, but does not have the in-plane direction region on the opposite side. The positive electrode collecting member 33d lacks the in-plane direction region on both sides. Thus, the collecting member of the first solid electrolyte layer or separator can be electrically connected to the extension of the negative electrode collector layer 1E alone on one side, while on both sides it is not electrically connected to the extension of the positive electrode collector layer 5E.

The negative electrode collecting member 31d fitted with the second solid electrolyte layer or separator lacks the in-plane direction region on both sides. The positive electrode collecting member 33c has the in-plane direction region 33a on one side, but lacks the in-plane direction region on the opposite side. Thus, the collecting member of the second solid electrolyte layer or separator can be electrically connected to the extension of the positive electrode collector layer 5E alone on one side, while on both sides it is not electrically connected to the extension of the negative electrode collector layer 1E.

Formation of the negative electrode stack 15 and positive electrode stack 16 may each be carried out in the same manner as for the stacked-cell battery 501 of the first embodiment (FIG. 10).

The first solid electrolyte layer or separator with a collecting member, the negative electrode stack 15, the second solid electrolyte layer or separator with a collecting member and the positive electrode stack 16 may be stacked in that order to obtain the desired stacked-cell battery 504.

As for the stacked-cell battery of the second embodiment which has the current collection structure of variation 1, in the method for producing a stacked-cell battery according to the second embodiment described above, the same manner as for production of the stacked-cell battery 502 except for using two different types of members for the positive electrode collecting member and the negative electrode collecting member may be carried out, which may be the following, as an example.

A method for producing a stacked-cell battery comprising a plurality of unit cells that are stacked, the unit cells comprising a negative electrode collector layer, a negative electrode active material layer, a solid electrolyte layer or a separator, a positive electrode active material layer and a positive electrode collector layer stacked in that order, comprising:

fitting a first negative electrode collecting member and a second positive electrode collecting member at the end of an insulating sheet different from the solid electrolyte layer or separator, and obtaining a first insulating layer with a collecting member, fitting a second negative electrode collecting member and a first positive electrode collecting member at the end of an insulating sheet that differs from a solid electrolyte layer or separator and is different from the first insulating sheet with the collecting member, and obtaining a second insulating layer with a collecting member, forming a negative electrode active material layer on both sides of the negative electrode collector layer to obtain a negative electrode stack, forming a positive electrode active material layer on both sides of the positive electrode collector layer to obtain a positive electrode stack, stacking the solid electrolyte layer or separator, the negative electrode stack, the solid electrolyte layer or separator and the positive electrode stack in that order to construct a cell region, and stacking the first insulating sheet with a collecting member part, the negative electrode collector layer in the negative electrode stack, the second insulating sheet with a collecting member part and the positive electrode collector layer in the positive electrode stack in that order to construct a collection region, the first negative electrode collecting member and first positive electrode collecting member including an in-plane direction region extending in the lengthwise direction of the stacked-cell battery, and the second negative electrode collecting member and second positive electrode collecting member including a stacking direction region extending in the stacking direction of the stacked-cell battery.

[Variation 2]

In the collection region of the stacked-cell battery of this embodiment, each individual negative electrode collecting member and positive electrode collecting member may be a member continuous through the extension of the solid electrolyte layer or the extension of the separator or the insulating sheet, at the end on the side opposite the cell region, in the lengthwise direction of the extension of the solid electrolyte layer or the extension of the separator or the insulating sheet.

Figure 13:
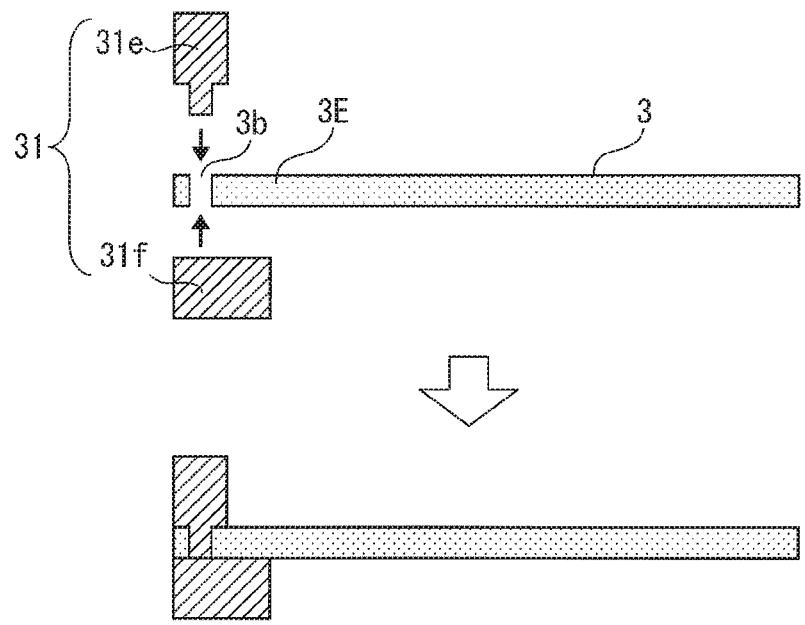
FIG. 13 is a schematic diagram for illustration of another example of the method to conduct collecting members in the stacking direction of the collecting member, in the stacked-cell battery of the disclosure.

An example of this embodiment is shown in FIG. 13, as an example in which the negative electrode collecting member is continuous through the extension of the solid electrolyte layer or the extension of the separator.

The embodiment of FIG. 13 is a method employing a solid electrolyte layer or separator having a through-hole $3b$ in the extension 3E, wherein the two different collecting member parts are conducted through the through-hole $3b$ in the stacking direction. The stacked-cell battery of this embodiment may have the same structure as any of the stacked batteries 501 to 504, except for the conduction through the through-hole $3b$ in the stacking direction.

Figure 14:
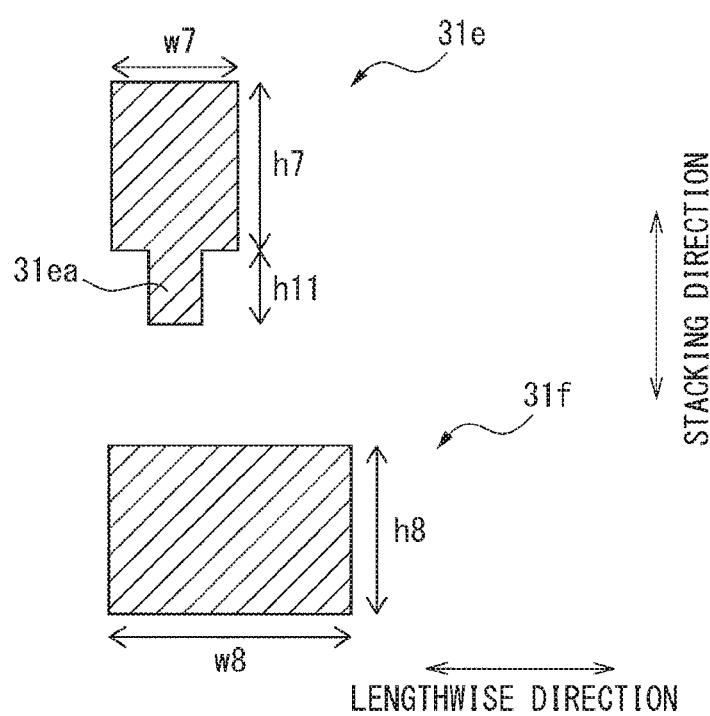
FIG. 14 is a magnified view of a collecting member part used in the production method illustrated in FIG. 13.

FIG. 14 is a magnified view of a negative electrode collecting member part used in the method shown in FIG. 13. For this embodiment, two different types of negative electrode collecting member parts are used, $31e$ and $31f$. The negative electrode collecting member part $31e$ has a protrusion $31ea$. The protrusion $31ea$ of the negative electrode collecting member part $31e$ engages with the through-hole $3b$ of the extension of the solid electrolyte layer or extension of the separator 3E, contacts with the negative electrode collecting member part $31f$ after stacking, and thereby forms electrical connection between the negative electrode collecting member parts $31e$ and $31f$ in the stacking direction.

The length $h11$ of the protrusion $31ea$ of the negative electrode collecting member part $31e$ in the stacking direction may be approximately the same as the length of the extension of the solid electrolyte layer or extension of the separator 3E in the stacking direction (thickness).

The length $w7$ in the lengthwise direction and the length $h7$ in the stacking direction of the negative electrode collecting member part $31e$, and the length $w8$ in the lengthwise direction and the length $h8$ in the stacking direction of the negative electrode collecting member part $31f$, may each be set with the same considerations as $w1$, $h1$, $w2$ and $h2$ for the negative electrode collecting member 31 used to produce the stacked-cell battery 501 shown in FIG. 1A to 1C.

When the negative electrode collecting member parts $31e$ and $31f$ are fitted onto the extension of the solid electrolyte layer or extension of the separator 3E with the through-hole $3b$, the portion of the negative electrode collecting member part $31f$ including the long side with length $w8$ forms the in-plane direction region $31a$ extending in the lengthwise direction, while the portion of the negative electrode collecting member part $31e$ including the short side with length $w7$ forms part of the stacking direction region $31b$ extending in the stacking direction.

The positive electrode collecting member may be formed using two different types of positive electrode collecting member parts having essentially the same shapes as for the negative electrode collecting members.

The through-hole $3b$ may also be formed as a notched section at the end of the extension of the solid electrolyte layer or the extension of the separator or the insulating sheet.

Formation of the through-hole or notched section in the extension of the solid electrolyte layer or the extension of the separator or the insulating sheet, and production of the collecting member part with the protrusion, can be carried out at a higher yield than forming raised sections or recesses in a thin-film collector layer. This embodiment is therefore advantageous over the prior art in this aspect.

[Variation 3]

As another mode where the negative electrode collecting member and positive electrode collecting member are members continuous through the extension of the solid electrolyte layer or the extension of the separator or the insulating sheet, at the end on the side opposite the cell region, in the lengthwise direction of the extension of the solid electrolyte layer or the extension of the separator or the insulating sheet, a different embodiment from the one described above may be employed.

Figure 15:
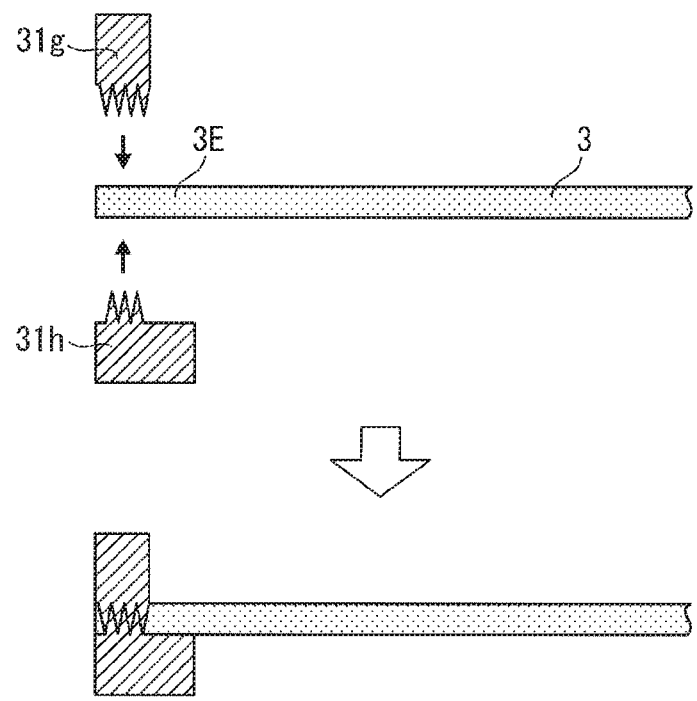
FIG. 15 is a schematic diagram for illustration of yet another example of the method to conduct collecting members in the stacking direction of the collecting member, in the stacked-cell battery of the disclosure.

An example of this embodiment is shown in FIG. 15, as an example in which the negative electrode collecting member is fitted onto the extension of the solid electrolyte layer or the extension of the separator.

The embodiment shown in FIG. 15 may be carried out in essentially the same manner as FIG. 13, except for changing the shapes of the collecting member parts used.

Figure 16:
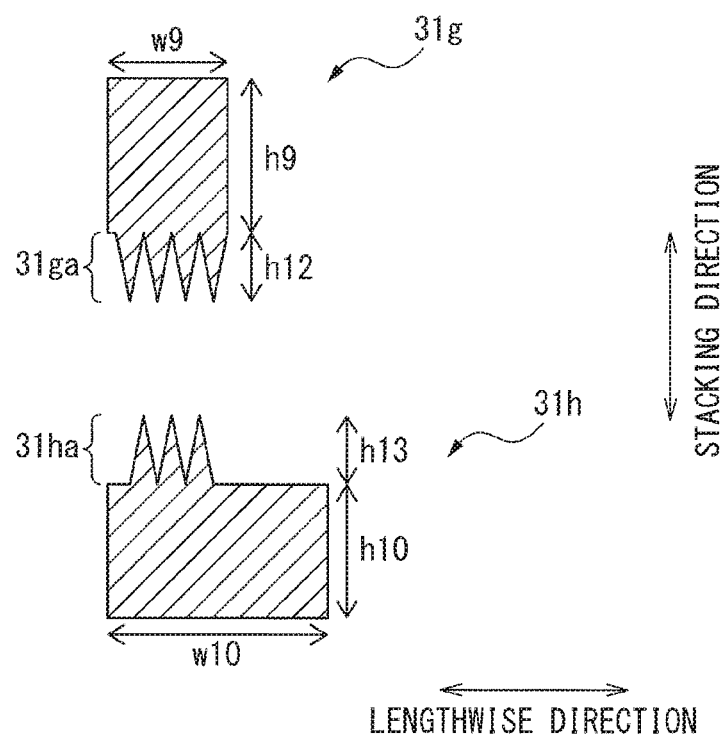
FIG. 16 is a magnified view of a collecting member part used in the production method illustrated in FIG. 15.

FIG. 16 is a magnified view of negative electrode collecting member parts used in the embodiment illustrated in FIG. 15. For this embodiment, two different types of negative electrode collecting member parts are used, $31g$ and $31h$. The negative electrode collecting member parts $31g$ and $31h$ have serrated protrusions $31ga$ and $31ha$ for formation of electrical connection in the stacking direction by engaging with each other through the extension of the solid electrolyte layer or extension of the separator 3E.

When the negative electrode collecting member parts $31g$ and $31h$ are to be fitted onto the extension of the solid electrolyte layer or extension of the separator 3E, the method may be one in which the negative electrode collecting member parts $31g$ and $31h$ are pushed in while heating the extension of the solid electrolyte layer or extension of the separator 3E, for example, so that the serrated protrusions 31ga and 31ha engage inside the extension of the solid electrolyte layer or extension of the separator 3E.

The lengths h12 and h13 of the respective serrated protrusions 31ga and 31ha of the negative electrode collecting member parts 31g and 31h in the stacking direction may each be approximately the same as the length of the extension of the solid electrolyte layer or extension of the separator 3E in the stacking direction (thickness).

The length w9 in the lengthwise direction and the length h9 in the stacking direction of the negative electrode collecting member part 31g, and the length w10 in the lengthwise direction and the length h10 in the stacking direction of the negative electrode collecting member part 31h, may each be set with the same considerations as the lengths w1, h1, w2 and h2 for the negative electrode collecting member 31 used to produce the stacked-cell battery 501 shown in FIG. 3.

When the negative electrode collecting member parts 31g and 31h are fitted onto the extension of the solid electrolyte layer or extension of the separator 3E, the portion of the negative electrode collecting member part 31h including the side with length w10 forms the negative electrode collecting section in-plane direction region 31a extending in the lengthwise direction, while the portion of the negative electrode collecting member part 31g including the short side with length w9 forms part of the negative electrode collecting section stacking direction region 31b extending in the stacking direction.

The positive electrode collecting members may be formed using positive electrode collecting member parts that are approximately the same as those for the negative electrode collecting member.

This embodiment is more advantageous than variation 2, in that it does not require formation of a through-hole in the extension of the solid electrolyte layer or the extension of the separator or the insulating sheet.

<Stacked-Cell Battery>

In either case, the stacked-cell battery may be joined between negative electrode collecting members that are adjacent in the stacking direction, between the negative electrode collector layers and negative electrode collecting members, between positive electrode collecting members that are adjacent in the stacking direction, and between the positive electrode collecting members and positive electrode collector layers. Any joining method may be used, with welding as an example. The welding method may be ultrasonic welding, for example.

The stacked-cell battery of this embodiment may be encapsulated in an exterior body, as necessary. When the desired stacked-cell battery is a wet-cell-battery, the stacked-cell battery may be encapsulated in an exterior body together with a suitable electrolyte solution.

The explanation given above with reference to FIGS. 1 to 10 is for cases where the lengths of the negative electrode active material layer 2 and positive electrode active material layer 4 in the stacking direction are approximately equal. The disclosure is not limited to such a construction, however, and it also includes cases where the lengths of the negative electrode active material layer 2 and positive electrode active material layer 4 in the stacking direction are different.

EXPLANATION OF SYMBOLS

1 Negative electrode collector layer
1E Extension of negative electrode collector layer
2 Negative electrode active material layer
3 Solid electrolyte layer or separator
3E Extension of solid electrolyte layer or extension of separator
3a Insulating sheet
3b Through-hole
4 Positive electrode active material layer
5 Positive electrode collector layer
5E Extension of positive electrode collector layer
10 Unit cell
30 Negative electrode collecting section
31 Negative electrode collecting member
31a In-plane direction region of negative electrode collecting section
31b Stacking direction region of negative electrode collecting section
31c, 31d Negative electrode collecting members
31e, 31f, 31g, 31h Negative electrode collecting member parts
31ea Protrusion
31ga, 31ha Serrated protrusions
32 Positive electrode collecting sections
33 Positive electrode collecting members
33a In-plane direction region of positive electrode collecting section
33b Stacking direction region of positive electrode collecting section
100 Cell region
200 Collection region
501, 502, 503, 504 Stacked-cell battery

What is claimed is:

1. A stacked-cell battery in which a plurality of unit cells are stacked, the unit cell each comprising a negative electrode collector layer, a negative electrode active material layer, a solid electrolyte layer or a separator, a positive electrode active material layer, and a positive electrode collector layer, stacked in that order, the stacked-cell battery having a stacking direction in which the unit cells are stacked, an in-plane direction perpendicular to the stacking direction, a lengthwise direction and a widthwise direction perpendicular to the lengthwise direction in the in-plane direction, wherein the stacked-cell battery, as viewed from the stacking direction, has:

1) a cell region each comprising the negative electrode collector layer, the negative electrode active material layer, the solid electrolyte layer or the separator, the positive electrode active material layer, and the positive electrode collector layer, and 2) a collection region adjacent in the lengthwise direction of the cell region, each comprising an extension of the negative electrode collector layer, an extension of the solid electrolyte layer or an extension of the separator or an insulating sheet, an extension of the positive electrode collector layer, a negative electrode collecting section, and a positive electrode collecting section, wherein the respective collection-region-side-ends of the extensions of the negative electrode collector layers and the extensions of the positive electrode collector layers have shapes that do not include recesses or raised sections, as viewed from the stacking direction, wherein the negative electrode collecting sections and the positive electrode collecting sections are at the ends of the collection region on the side opposite the cell region, and mutually separated in the widthwise direction by a spacing between them, as seen from the stacking direction, wherein the negative electrode collecting sections are connected to each of the extensions of the negative electrode collector layers of the plurality of unit cells to electrically connect the extensions of the negative electrode collector layers of the plurality of unit cells together, but are not connected to the extensions of the positive electrode collector layers, wherein the positive electrode collecting sections are connected to each of the extensions of the positive electrode collector layers of the plurality of unit cells to electrically connect the extensions of the positive electrode collector layers of the plurality of unit cells together, but are not connected to the extensions of the negative electrode collector layers, and wherein at the collecting sections, the extensions of the solid electrolyte layers or the extensions of the separators or the insulating sheets lie all interspaces between the negative electrode collector layers and positive electrode collector layers of the stacked-cell battery.

2. The stacked-cell battery according to claim 1, wherein the ends of the extensions of the solid electrolyte layers or the extensions of the separators or the insulating sheets, on the side opposite the cell regions in the lengthwise direction, are anchored in the negative electrode collecting sections or the positive electrode collecting sections.

3. The stacked-cell battery according to claim 1, wherein the negative electrode collecting sections are composed of a plurality of negative electrode collecting members, and each of the plurality of negative electrode collecting members comprising an in-plane direction region extending in the lengthwise direction and a stacking direction region extending in the stacking direction, the in-plane direction regions of the negative electrode collecting members being electrically connected respectively to the extensions of the negative electrode collector layers, and the stacking direction regions of the plurality of negative electrode collecting members being connected in the stacking direction together either directly or through the extensions of the negative electrode collector layers, so that the plurality of negative electrode collecting members are electrically connected together, and the positive electrode collecting sections are composed of a plurality of positive electrode collecting members, each of the plurality of positive electrode collecting members comprising an in-plane direction region extending in the lengthwise direction and a stacking direction region extending in the stacking direction, the in-plane direction regions of the positive electrode collecting members being electrically connected respectively to the extensions of the positive electrode collector layers, and the stacking direction regions of the plurality of positive electrode collecting members being connected in the stacking direction together either directly or through the extensions of the positive electrode collector layers, so that the plurality of positive electrode collecting members are electrically connected together.

4. The stacked-cell battery according to claim 3, wherein plurality of the stacking direction regions of the negative electrode collecting members are connected in the stacking direction through the extensions of the negative electrode collector layers, first lengths of the plurality of negative electrode collecting members are smaller in the stacking direction than second lengths of the plurality of negative electrode collecting members, the first lengths of the negative electrode collecting members in the stacking direction being lengths from the extensions of the solid electrolyte layers or the extensions of the separators or the insulating sheets to the extensions of the negative electrode collector layers, and the second lengths of the negative electrode collecting members in the stacking direction being lengths from the extensions of the solid electrolyte layers or the extensions of the separators or the insulating sheets to the extensions of the positive electrode collector layers, and plurality of the stacking direction regions of the positive electrode collecting members are connected in the stacking direction through the extensions of the positive electrode collector layers, first lengths of the plurality of positive electrode collecting members are smaller in the stacking direction than second lengths of the plurality of positive electrode collecting members, the first lengths of the positive electrode collecting members in the stacking direction being lengths from the extensions of the solid electrolyte layers or the extensions of the separators or the insulating sheets to the extensions of the positive electrode collector layers, the second lengths of the plurality of positive electrode collecting members in the stacking direction being lengths from the extensions of the solid electrolyte layers or the extensions of the separators or the insulating sheets to the extensions of the negative electrode collector layers.

5. The stacked-cell battery according to claim 3, wherein the negative electrode collecting members and the positive electrode collecting members are members continuous on the outsides of the ends of the extensions of the solid electrolyte layers or the extensions of the separators or the insulating sheets, the end being opposite from the cell region in the lengthwise direction.

6. The stacked-cell battery according to claim 3, wherein the negative electrode collecting members and the positive electrode collecting members are members continuous through the extensions of the solid electrolyte layers or the extensions of the separators or the insulating sheets at the ends of the extensions of the solid electrolyte layers or the extensions of the separators or the insulating sheets, the end being opposite from the cell region in the lengthwise direction.

7. The stacked-cell battery according to claim 1, wherein the length of the collection region in the stacking direction and the length of the cell region in the stacking direction are approximately equal.

* * * * *